United States Patent
Na et al.

(10) Patent No.: US 12,416,729 B2
(45) Date of Patent: Sep. 16, 2025

(54) SYSTEM AND METHOD FOR IMPROVING 3D SENSOR MEASUREMENT ACCURACY

(71) Applicant: Artilux, Inc., Menlo Park, CA (US)

(72) Inventors: Yun-Chung Na, Hsinchu County (TW); Yu-Shiuan Li, Hsinchu County (TW); Hung-Chih Chang, Hsinchu County (TW); Der-Song Lin, Hsinchu County (TW)

(73) Assignee: Artilux, Inc., Menlo Park, CA (US)

( * ) Notice: Subject to any disclaimer, the term of this patent is extended or adjusted under 35 U.S.C. 154(b) by 1023 days.

(21) Appl. No.: 17/363,831

(22) Filed: Jun. 30, 2021

(65) Prior Publication Data

US 2022/0050206 A1     Feb. 17, 2022

Related U.S. Application Data

(60) Provisional application No. 63/065,482, filed on Aug. 13, 2020.

(51) Int. Cl.
*G01S 17/894* (2020.01)
*G01B 11/02* (2006.01)
(Continued)

(52) U.S. Cl.
CPC .......... *G01S 17/894* (2020.01); *G01B 11/026* (2013.01); *G01B 11/03* (2013.01); *H04N 23/45* (2023.01)

(58) Field of Classification Search
CPC ........ G01S 17/894; G01S 17/08; G01S 17/39; G06N 20/00; G01B 11/26; G01B 11/03; G01B 11/026; H04N 23/45
See application file for complete search history.

(56) References Cited

U.S. PATENT DOCUMENTS

| 10,345,447 | B1 * | 7/2019 | Hicks | G01S 17/931 |
| 2019/0129035 | A1 | 5/2019 | Valouch et al. | |

(Continued)

FOREIGN PATENT DOCUMENTS

WO    WO-2020037167 A1 *  2/2020  ............ G01S 17/32

OTHER PUBLICATIONS

J. Marquez, J. Morris, G. Gimel'farb, P. Delmas, A. Woodward and D. An, "Comparison of Active Structure Lighting Mono and Stereo Camera Systems: Application to 3D Face Acquisition," 2006 Seventh Mexican International Conference on Computer Science, San Luis Potosi, Mexico, 2006, pp. 135-141 (Year: 2006).*

(Continued)

*Primary Examiner* — Yuqing Xiao
*Assistant Examiner* — Isabelle Lin Boegholm
(74) *Attorney, Agent, or Firm* — Dority & Manning, P.A.

(57) ABSTRACT

Systems and methods improving three-dimensional sensor measurement accuracy are provided. For instance, an example apparatus can include a distance-estimation system, a distance-refinement system, and a processing system. The distance-estimation system can be configured to receive a first optical signal and determine a first distance between two points in an environment. The distance-refinement system can be configured to receive a second optical signal and determine a second distance between the two points in the environment. The processing system can be configured to receive information representing the first distance and the second distance and determine, based on the first distance and the second distance, a third distance between the two points in the environment. The difference between a true distance of the two points in the environment and the first distance can be larger than a difference between the true distance of the two points in the environment and the third distance.

19 Claims, 12 Drawing Sheets

(51) Int. Cl.
  *G01B 11/03* (2006.01)
  *H04N 23/45* (2023.01)

(56) References Cited

U.S. PATENT DOCUMENTS

| | | |
|---|---|---|
| 2020/0057151 A1 | 2/2020 | Finkelstein et al. |
| 2020/0090355 A1* | 3/2020 | Hall .................. G01B 11/2513 |
| 2020/0158876 A1* | 5/2020 | Karadeniz ............. G01S 7/4808 |
| 2020/0193640 A1* | 6/2020 | Mathy .................... G01S 7/497 |
| 2022/0043149 A1* | 2/2022 | LaChapelle ........... G01S 7/4865 |

OTHER PUBLICATIONS

Chen et al, "An Up-to-1400nm 500MHz Demodulated Time-of-Flight image Sensor on a Ge-on-Si Platform", International Solid-State Circuits Conference, Feb. 16-20, San Francisco, 2020, 3 pages.

Extended European Search Report for Application No. 21178049.9, mailed Feb. 8, 2022, 13 pages.

Zhang, et al. "Optimization Design and Simulation of Phase Laser Ranging System", Journal of Computer Science, vol. 33, No. 2, Feb. 2016, p. 42.

* cited by examiner

SYSTEM AND METHOD FOR IMPROVING 3D SENSOR MEASUREMENT ACCURACY

RELATED APPLICATIONS

The present application claims filing benefit of U.S. Provisional Patent Application Ser. No. 63/065,482 having a filing date of Aug. 13, 2020, which is incorporated herein by reference in its entirety.

FIELD

The present disclosure relates generally to sensor systems. In particular, the present disclosure relates to systems that can detect optical signals, estimate a distance to an object, and refine the estimated distance to determine an accurate distance measurement. The systems can initiate one or more operations based on the accurate distance measurement.

BACKGROUND

Sensors are being used in many applications, such as smartphones, robotics, and autonomous vehicles, etc. to determine characteristics (e.g., object recognition, object classification, depth information, edge detection, motion information, etc.) of objects in an environment. However, such determination may be associated with an uncertainty, or estimation errors. For example, an RGB camera can be used to detect an edge of an object, but if one object partially overlaps with another object, a software (e.g., a machine-learned model) that uses an RGB image to detect the edge of the object may produce an output with some uncertainty.

As another example, 3D image sensors, or depth sensors, may utilize principles such as stereo, direct time-of-flight (d-ToF), and indirect ToF (i-ToF) techniques. However, i-ToF sensors may have ambiguous error issues. For example, in an i-ToF system, high modulation frequency (e.g., 300 MHz) can result in high depth-resolution and accuracy, but the unambiguous range is limited (e.g., 50 cm). As such, an i-ToF sensor may not be able to differentiate between a distance of 10 cm and a distance of 60 cm, and ambiguous errors, or aliasing, may occur.

One approach to overcome the ambiguous error issue in an i-ToF system is to use an additional low modulation frequency (e.g., 75 MHz) in the time domain to extend seeable range. However, if multiple modulation frequencies are divided in time, this approach will lower the system frame rate, which may result in motion artifacts and other hardware side effects. Alternatively, if the system frame rate maintains the same when adding multiple modulation frequencies, the integration time for each frequency will be reduced, which may result into lower depth-resolution and accuracy. Moreover, de-aliasing errors may still occur with multi-modulation-frequency sensing especially when the system signal-to-noise ratio (SNR) gets lower, e.g., at farther distances.

To overcome sensor uncertainty or errors, the use of multiple types of sensors may be combined to yield more accurate results. For example, to overcome the ambiguous errors and/or de-aliasing errors while maintaining system frame rate and high depth-resolution, a low-depth-resolution depth map generated using a distance estimation system (e.g., an RGB camera coupled with a machine-learned model) can be combined with a high-depth-resolution depth map generated by i-ToF sensor(s) to yield a final depth map having high depth-resolution/accuracy and extended seeable range.

SUMMARY

Aspects and advantages of embodiments of the present disclosure will be set forth in part in the following description, or may be learned from the description, or may be learned through practice of the embodiments.

One example aspect of the present disclosure is directed to an apparatus. The apparatus includes a distance-estimation system including a sensor system. The distance-estimation system is configured to receive a first optical signal; and determine, based on the first optical signal, a first distance between two points in an environment. The apparatus includes a distance-refinement system including one or more indirect time-of-flight sensors. The distance-refinement system is configured to receive a second optical signal; and determine, based on the second optical signal, a second distance between the two points in the environment. The apparatus includes a processing system including one or more computing devices. The processing system is configured to receive information representing the first distance and the second distance; and determine, based on the first distance and the second distance, a third distance between the two points in the environment. A difference between (i) a true distance of the two points in the environment and (ii) the first distance is larger than a difference between (i) the true distance of the two points in the environment and (ii) the third distance.

Another example aspect of the present disclosure is directed to a method of determining a distance between two points in an environment. The method includes receiving, by a sensor system, a first optical signal. The method includes determining, by the sensor system and based on the first optical signal, a first distance between two points in an environment. The method includes receiving, by one or more indirect time-of-flight sensors separate from the sensor system, a second optical signal. The method includes determining, by the one or more indirect time-of-flight sensors and based on the second optical signal, a second distance between the two points in the environment. The method includes receiving, by one or more computing devices, information representing the first distance and the second distance. The method includes determining, by the one or more computing devices and based on the first distance and the second distance, a third distance between the two points in the environment. A difference between (i) a true distance of the two points in the environment and (ii) the first distance is larger than a difference between (i) the true distance of the two points in the environment and (ii) the third distance.

Yet another example aspect of the present disclosure is directed to an apparatus. The apparatus includes a distance-estimation system including a sensor system. The distance-estimation system is configured to receive a first optical signal; and generate, based on the first optical signal, a first electrical signal for determining a first distance between two points in an environment. The apparatus includes a distance-refinement system including one or more indirect time-of-flight sensors. The distance-refinement system is configured to receive a second optical signal; and generate, based on the second optical signal, a second electrical signal for determining a second distance between the two points in the environment. The apparatus includes a processing system including one or more computing devices. The processing system is configured to receive the first electrical signal and the second electrical signal; provide input information representing the first electrical signal and the second electrical signal to a machine-learned model; receive output information representing a third distance between the two points in the environment; and determine the third distance between the two points in the environment. A maximum value of the second distance is less than an unambiguous range associated with the one or more indirect time-of-flight sensors. A maximum value of the third distance is more than the unambiguous range associated with the one or more indirect time-of-flight sensors.

Yet another example aspect of the present disclosure is directed to an apparatus. The apparatus includes an estimation system including a sensor system. The estimation system is configured to receive a first signal; and determine, based on the first signal, a first value for a characteristic associated with a target object in an environment. The apparatus includes a refinement system including one or more indirect time-of-flight sensors. The refinement system is configured to receive a second signal; and determine, based on the second signal, a second value for the characteristic associated with the target object in the environment. The apparatus includes a processing system including one or more computing devices. The processing system is configured to receive information representing the first value and the second value; and determine, based on the first value and the second value, a third value for the characteristic associated with the target object in the environment. A difference between (i) a true value for the characteristic associated with the target object in the environment and (ii) the first value is larger than a difference between (i) true value for the characteristic and (ii) the third value.

Other example aspects of the present disclosure are directed to systems, methods, apparatuses, sensors, computing devices, tangible, non-transitory computer-readable media, and memory devices related to the described technology.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

The foregoing aspects and many of the attendant advantages of this application will become more readily appreciated as the same becomes better understood by reference to the following detailed description, when taken in conjunction with the accompanying drawings, wherein.

DETAILED DESCRIPTION

Example aspects of the present disclosure are directed to improved systems and methods for determining a distance between two points in an environment. For instance, a depth-sensing system can leverage a distance estimation from a sensor of a first type (e.g., RGB camera) and a refined distance estimation from a sensor of a second type (e.g., an indirect time-of-flight sensor) to determine a more accurate estimation of a distance between a device (e.g., a user device, robotic platform, etc.) and an object within the environment of the device. In some implementations, the depth-sensing system can utilize one or more trained machine-learned model(s). For example, the machine-learned model(s) can receive the distance estimates as input and, in response, output a more accurate estimation of the distance between the device and the object, as will be further described herein.

The systems and methods of the present disclosure provide a variety of technical effects and benefits. For instance, the technology of the present disclosure provides improved depth and distance estimation, which can allow for improved functioning of the systems utilizing these techniques. This can include improved perception and motion control of robotic platforms, application operations for user devices, etc. Moreover, the systems and methods of the present disclosure can detect and correct de-aliasing errors by comparing the different distance estimations from the different sensor modalities. Accordingly, the technology described herein can improve three-dimensional sensor accuracy and, thus, improve the functionality of the systems implementing such techniques.

With reference to the figures, example embodiments of the present disclosure will be discussed in further detail. It should be understood that embodiments, features, hardware, software, and/or other elements described with respect to one figure can be utilized within the systems and processes of another figure.

Figure 1:
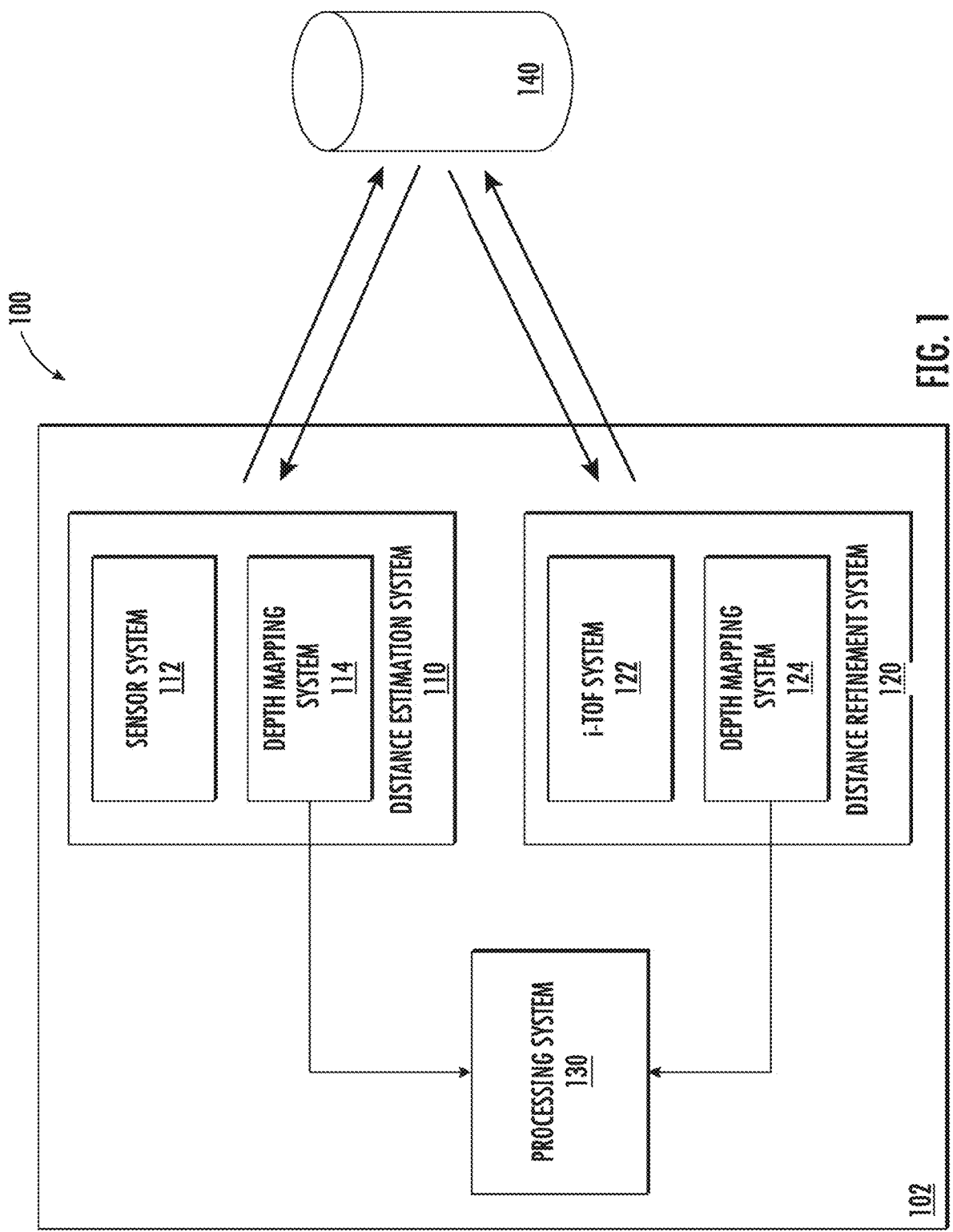
FIG. 1 depicts a block diagram of an example depth-sensing system according to example aspects of the present disclosure.

FIG. 1 shows a depth-sensing system 100 for determining a distance between a device 102 and an object 140 in an environment. The device 102 may be a mobile device (e.g., smartphone, tablet, wearable device, vehicle, drone, etc.) or a stationary device (e.g., surveillance system, robotic arm, etc.). The device 102 includes a distance estimation system 110, a distance refinement system 120, and a processing system 130.

The distance estimation system 110 can be configured to receive a first optical signal and determine, based on the first optical signal, a first distance between two points in an environment. For instance, the distance estimation system 110 is configured to receive an optical signal, and based on the optical signal, determine a distance between the device 102 and the object 140. The distance estimation system 110 may include a sensor system 112 and a depth mapping system 114. In general, the sensor system 112 receives an optical signal (e.g., reflected light) from the object 140, and generates one or more electrical signals. The sensor system 112 can include a sensor array configured to receive the first optical signal and generate one or more first electrical signals. The sensor array can be a sensor array of an RGB camera. In some implementations, the sensor system 112 can include a stereo camera having a plurality of lenses, a structured light detection system, and/or one or more direct time-of-flight (d-ToF) sensors.

Figure 2:
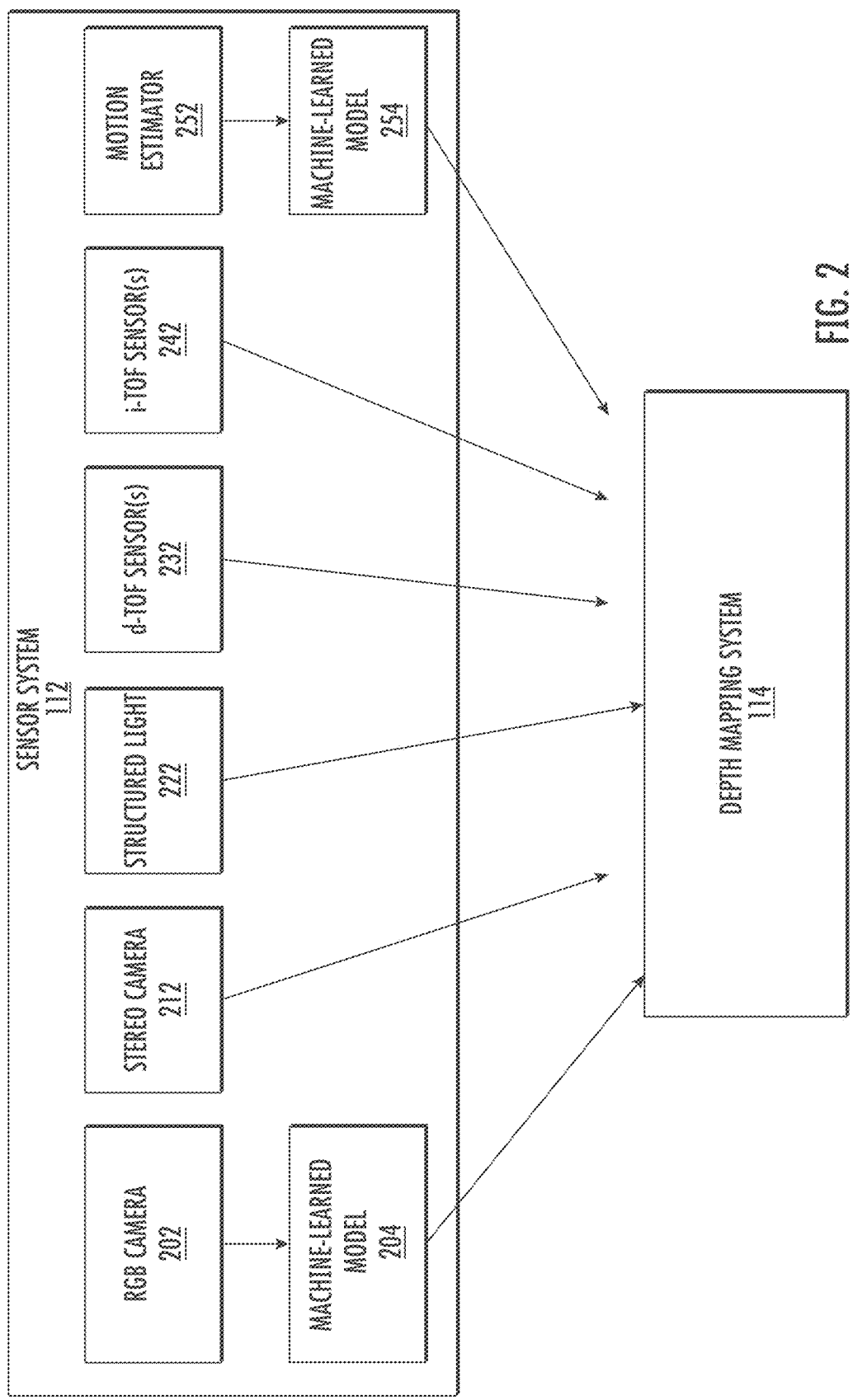
FIG. 2 depicts a block diagram of an example distance estimation system according to example aspects of the present disclosure.

For instance, referring to FIG. 2 as an example, the sensor system 112 may be implemented using an RGB camera 202 (or an IR camera) coupled with a machine-learned model 204, or a stereo camera 212, or a structured light system 222, or a d-ToF sensor 232, or an i-ToF sensor 242, or a motion estimator 252 coupled with a machine-learned model 254 (e.g., depth estimation based on motion estimate as determined by multiple images captured by one or more image sensors over time), or a sonar sensor, or a radar sensor, or position sensors (e.g., accelerometer, gyroscope, NFC, GPS, etc.), or a combination of any of the sensors mentioned above. The depth mapping system 114 receives the one or more electrical signals from the sensor system 112 and determines the distance between the device 102 and the object 140. For example, when using one or more direct time-of-flight sensors, a first distance can be determined based on a round-trip travel time of light between two points in the environment (e.g., the distance between the device 102 and the object 140). The depth mapping system 114 may be implemented using hardware circuitry (e.g., ASIC, FPGA), a lookup table, one or more processors (e.g., MCU, CPU, GPU, TPU) with software, or any other suitable ways.

Referring back to FIG. 1, the distance refinement system 120 can be configured to receive a second optical signal and determine, based on the second optical signal, a second distance between the two points in the environment. For example, in FIG. 1, the distance refinement system 120 is configured to receive an optical signal, and based on the optical signal, determine a distance between the device 102 and the object 140. The distance refinement system 120 may include one or more i-ToF systems 122 and a depth mapping system 124. The depth mapping system 124 may also be implemented using hardware circuitry (e.g., ASIC, FPGA), a lookup table, one or more processors (e.g., MCU, CPU, GPU, TPU) with software, or any other suitable ways.

Figure 3:
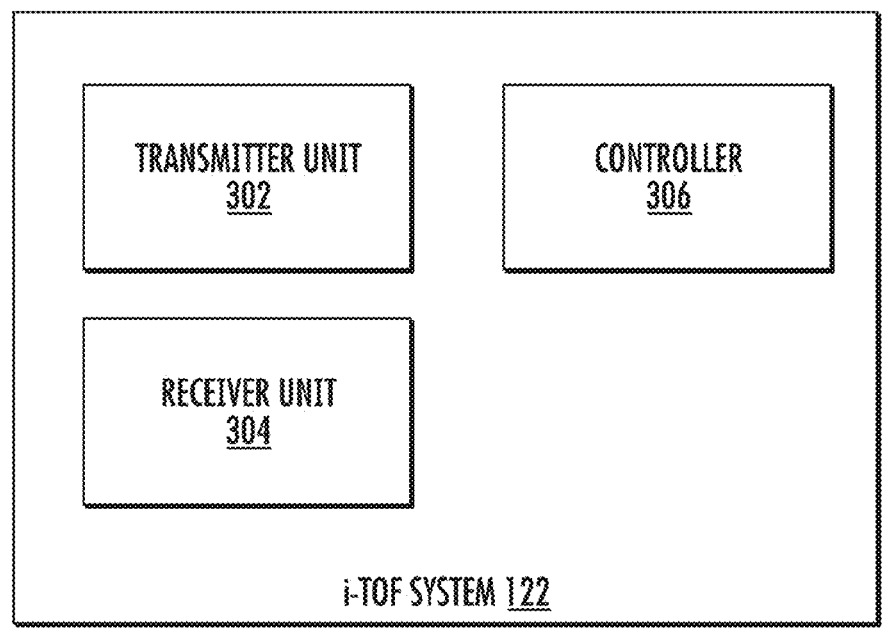
FIG. 3 depicts a block diagram of an example sensor system according to example aspects of the present disclosure.

Referring to FIG. 3 as an example, the one or more i-ToF systems 122 may include a transmitter unit 302, a receiver unit 304, and a controller 306. During operation, the transmitter unit 302 may emit an emitted light toward a target object (e.g., object 140). The receiver unit 304 may receive reflected light reflected from the target object. The controller 306 may drive at least the transmitter unit 302 and the receiver unit 304. In some embodiments, the one or more i-ToF systems 122 can be configured to operate at a first frequency. The sensor system 112 can include one or more second indirect time-of-flight sensors operating at a second frequency that is different from the first frequency.

The transmitter unit 302 may include one or more light sources that emit light with a peak wavelength in an invisible range wavelength range above 800 nm, such as 850 nm, 940 nm, 1050 nm, 1064 nm, 1310 nm, 1350 nm, or 1550 nm.

The receiver unit 304 may include one or more i-ToF sensors such as a pixel array. The i-ToF sensors may be formed using a Group III-V semiconductor material (e.g., GaAs/AlAs, InP/InGaAs/InAlAs, GaSb/InAs, or InSb), a semiconductor material comprising a Group IV element (e.g., Ge, Si or Sn), a compound such as $Si_xGe_ySn_{1-x-y}$, ($0 \le x \le 1$, $0 \le y \le 1$, $x+y \le 1$), or $Ge_{1-a}Sn_a$ ($0 \le a \le 1$), or $Ge_{1-x}Si_x$ ($0 \le x \le 1$).

Figure 11:
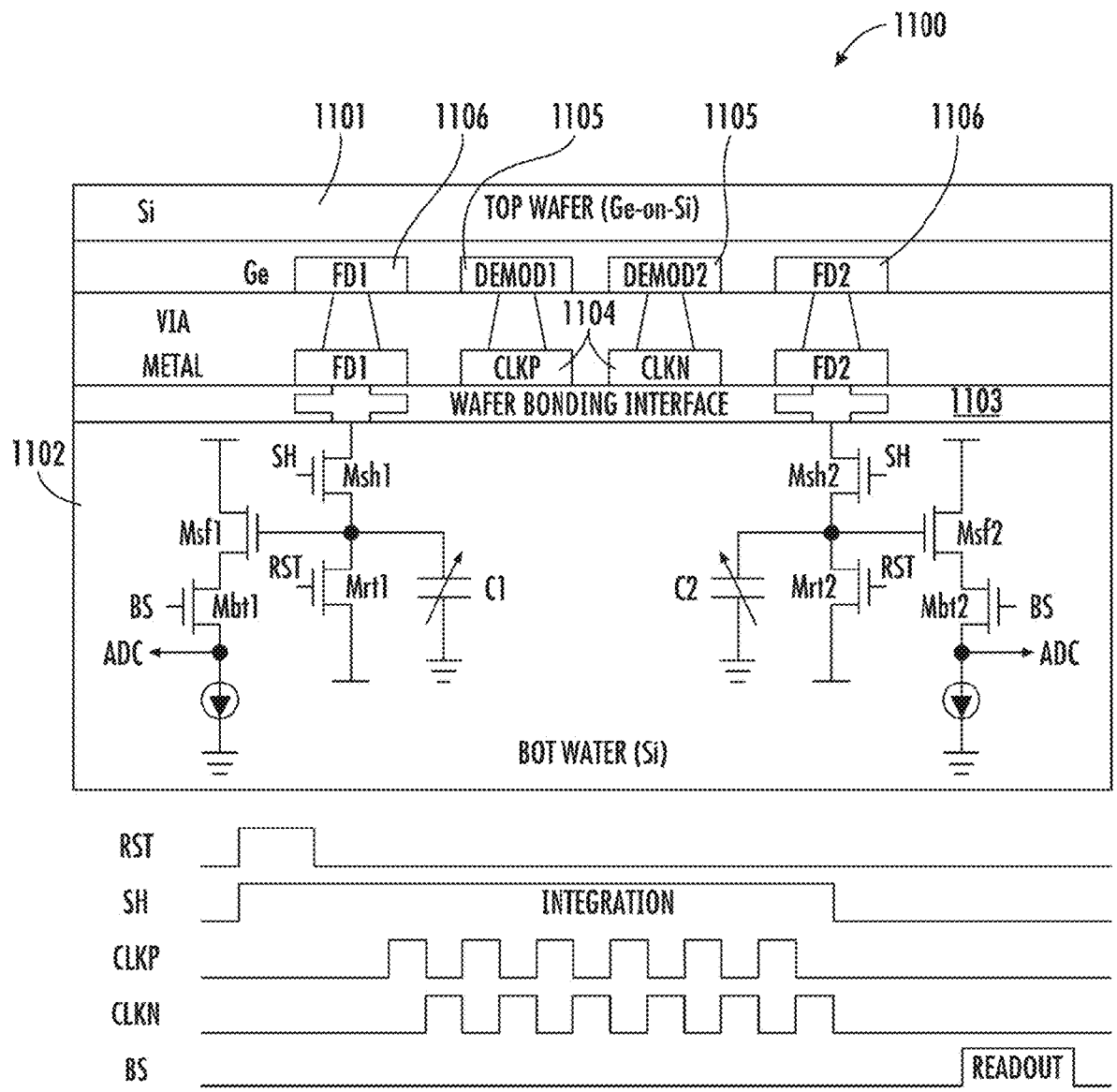
FIG. 11 depicts a cross-section view of an example portion of an example photodetector according to example aspects of the present disclosure.

By way of example, a pixel array can be implemented in a Germanium-on-Silicon (Ge-on-Si) platform. FIG. 11 shows an example pixel array cross-section (and clock signals suitable for use in a pixel array) in a Ge-on-Si platform 1100. The example pixel array depicted in FIG. 11 implements a Ge-on-Si architecture, which can allow for absorption of wavelengths in the near-infrared (NIR, e.g., wavelength range from 780 nm to 1400 nm, or any similar wavelength range as defined by a particular application) and short-wave infrared (SWIR, e.g., wavelength range from 1400 nm to 3000 nm, or any similar wavelength range as defined by a particular application) spectrum. This can allow for better signal-to-noise ratios (SNR) to be achieved while staying within maximum permissible exposure limits (MPE).

The Ge-on-Si platform 1100 can be associated with an i-ToF image sensor. For example, the i-ToF image sensor can be developed in a back-side illumination (BSI) configuration, in which the Ge region is formed on a first wafer 1101 (e.g., top wafer) and one or more circuits are located in a second wafer 1102 (e.g., bottom wafer). The first wafer 1101 and the second wafer 1102 can be bonded together through a wafer bonding interface 1103. In some embodiments, the pixels can follow a two-tap lock-in pixel architecture. One or more differential demodulation clocks 1104 (e.g., CLKP, CLKN) can be distributed on the first wafer 1101 so as, for example, to create a continuously switching lateral electric field at the Ge surface (e.g., the side closer to VIA) between first node(s) 1105 (e.g., Demod1, Demod2) in every pixel. Photo-charges can be collected through second node(s) 1106 (e.g., FD1, FD2). In some embodiments, since most of the photo-charges can be generated inside the Ge layer and the Ge layer can be thin, the lateral electric field at the Ge surface can effectively sweep the photo-charges to the second node(s) 1106. Moreover, the transit time for the photo-charges drifting to one or more of the second node(s) 1106 (e.g., FD1 and/or FD2) can be short, again, due to the thin Ge layer, and therefore the demodulation speed can be significantly improved. In some embodiments, to minimize the coupling to any sensitive high-impedance node and relax the design rule requirement, the second node(s) 1106 (e.g., FD1 and/or FD2) can be interacted with the wafer bonding interface overlapping with the pixel area. The one or more differential demodulation clocks 1104 (e.g., CLKP and/or CLKN) can be routed to the second wafer 1102 clock drivers outside the pixel region. The pixel demodulation drivers can be realized with tapered inverter chains and the supply of the inverter chains can be adjusted to maximize performance. In some embodiments, the pixel circuits can be implemented as a differential 4-transistor architecture. A simplified timing diagram is also shown in the bottom of FIG. 11. Before every exposure, all pixels can be reset through Msh1/Msh2 and Mrt1/Mrt2 controlled by signal RST. After optical exposure, integration, and demodulation, the collected photo-charges can be stored on C1 and C2 controlled by signal SH. Finally, the readout to ADC can be accomplished through the source follower Msf1/Msf2 and the row-select switch Mbt1/Mbt2 controlled by signal BS. In some embodiments, 4-quad measurements can be implemented to recover the depth information without suffering from analog non-idealities.

Returning to FIG. 3, in some embodiments, the controller 306 includes a timing generator and a processing unit. The timing generator receives a reference clock signal and provides timing signals to the transmitter unit 302 for modulating the emitted light. The timing signals are also provided to the receiver unit 304 for controlling the collection of the photo-carriers. The processing unit processes the photo-carriers generated and collected by the receiver unit 304 and determines raw data of the target object. The processing unit may include control circuitry, one or more signal processors for processing the information output from the receiver unit 304, and/or computer storage medium that may store instructions for determining the raw data of the target object or store the raw data of the target object. In general, the controller 306 determines a distance between two points by using the phase difference between light emitted by the transmitter unit 302 and light received by the receiver unit 304.

In some cases, the receiver unit 304 and the controller 306 are implemented on one semiconductor chip, such as a system-on-a-chip (SoC). In some cases, the transmitter unit 302 is implemented by two different semiconductor chips, such a laser emitter chip on III-V substrate and a Si laser driver chip on Si substrate.

Figure 4:
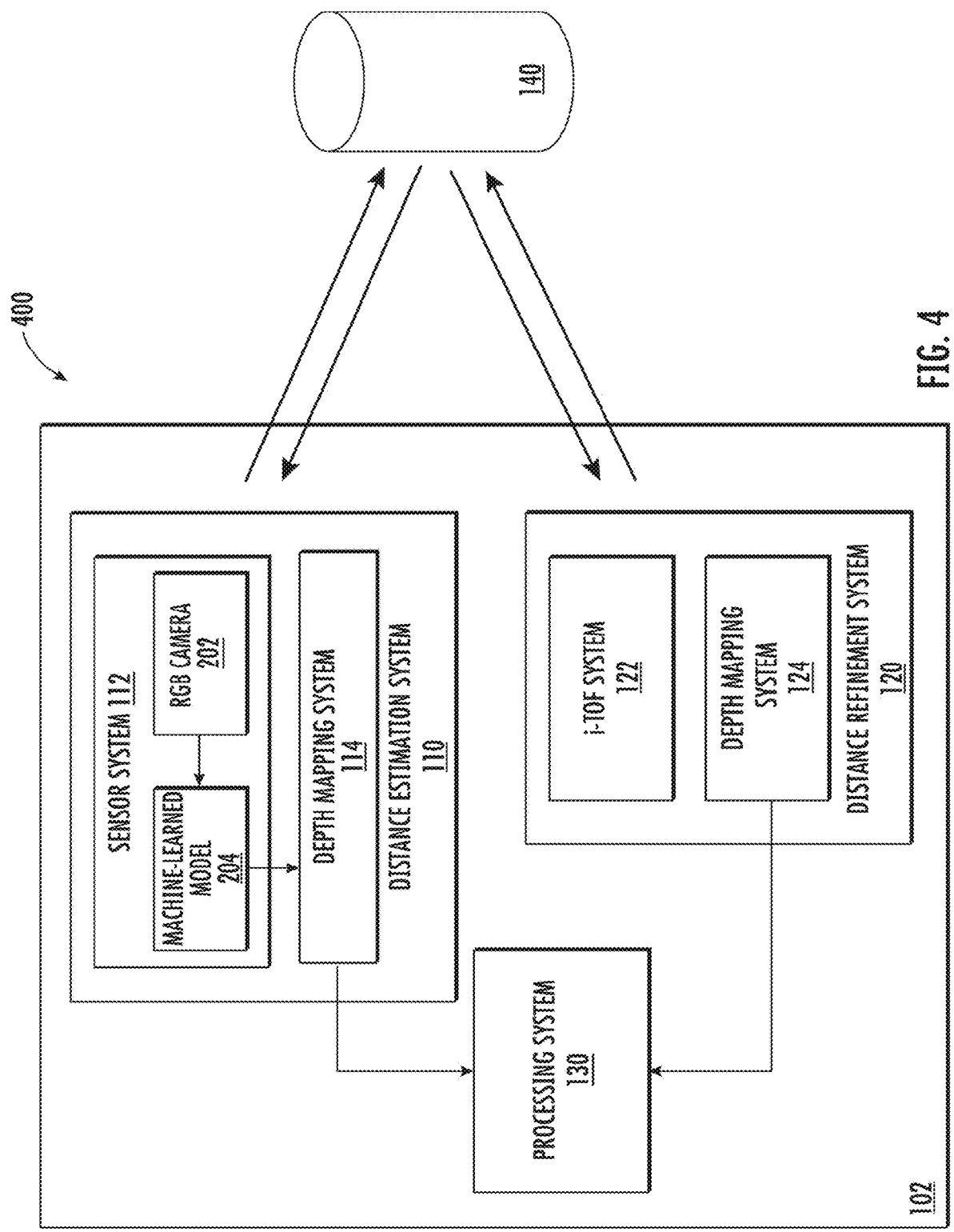
FIG. 4 depicts an example system according to example aspects of the present disclosure.

FIG. 4 shows an example system 400, where the sensor system 112 includes an RGB camera 202 and a machine-learned model 204. The RGB camera 202 can be any suitable camera (e.g., a CMOS digital camera) that can optically capture an image of an environment and convert the image into an electrical signal. One or more storage media can be configured to store one or more machine-learned models. The one or more machine-learned models can be trained to receive a representation of the one or more first electrical signals as input and provide an output representing the first distance. By way of example, the representation of one or more first electrical signals can include at least a portion of an optical image outputted by the RGB camera 202. The machine-learned model 204, for example, has been trained to receive a portion of the image (e.g., a portion of the image that includes the object 140 in the environment) captured by the RGB camera 202 as an input, and to generate an output that represents a distance between the device 102 and the object 140. Additionally, or alternatively, the sensor system 112 can include a stereo camera. The one or more first electrical signals can include at least a portion of a three-dimensional image outputted by the stereo camera. In some embodiments, the machine-learned model 204 has been trained to, additionally or alternatively, receive at least a portion of a three-dimensional image outputted by the stereo camera as an input, and to generate an output that represents a distance between the device 102 and the object 140. In some implementations, the machine-learned model 204 may be a convolutional neural network model, a deep neural network model, or any other suitable machine-learned models. In general, the distance, or depth, determined using the distance estimation system 110 provides a good estimate, but tends to have a higher error and/or a lower depth-resolution, as the machine-learned model 204 is trained based on empirical training data (e.g., a set of training images with distance information) and may not accurately account for all possible scenarios during operation.

By contrast, a depth-resolution of an i-ToF sensor is dependent on a demodulation frequency of the i-ToF sensor. At a high demodulation frequency (e.g. 300 MHz), the i-ToF sensor generally has a high depth-resolution with a lower error. However, an i-ToF sensor is limited by its unambiguous range, which can be defined as:

$$\text{Unambigous Range} = \frac{c}{2 \times f_{demod}}, \tag{1}$$

where c is the speed of light and $f_{demod}$ is the demodulation frequency. As example, at a an demodulation frequency of 300 MHz, the unambiguous range of an i-ToF sensor is 50 cm. As such, when operating at 300 MHz, an i-ToF sensor may not be able to differentiate between a distance of 10 cm and a distance of 60 cm, and ambiguous errors may occur.

Since the distance estimation system 110 may provide a higher-error but longer range distance estimate between the device 102 and the object 140, and the distance refinement system 120 may provide a lower-error distance within the unambiguous range, the processing system 130 may combine distance information from both the distance estimation system 110 and the distance refinement system 120, and determine a distance between the device 102 and the object 140 with high accuracy and long range. The processing system 130 may be implemented using hardware circuitry (e.g., ASIC, FPGA), a lookup table, one or more processors (e.g., MCU, CPU, GPU, TPU) with software, or any other suitable ways.

Figure 5:
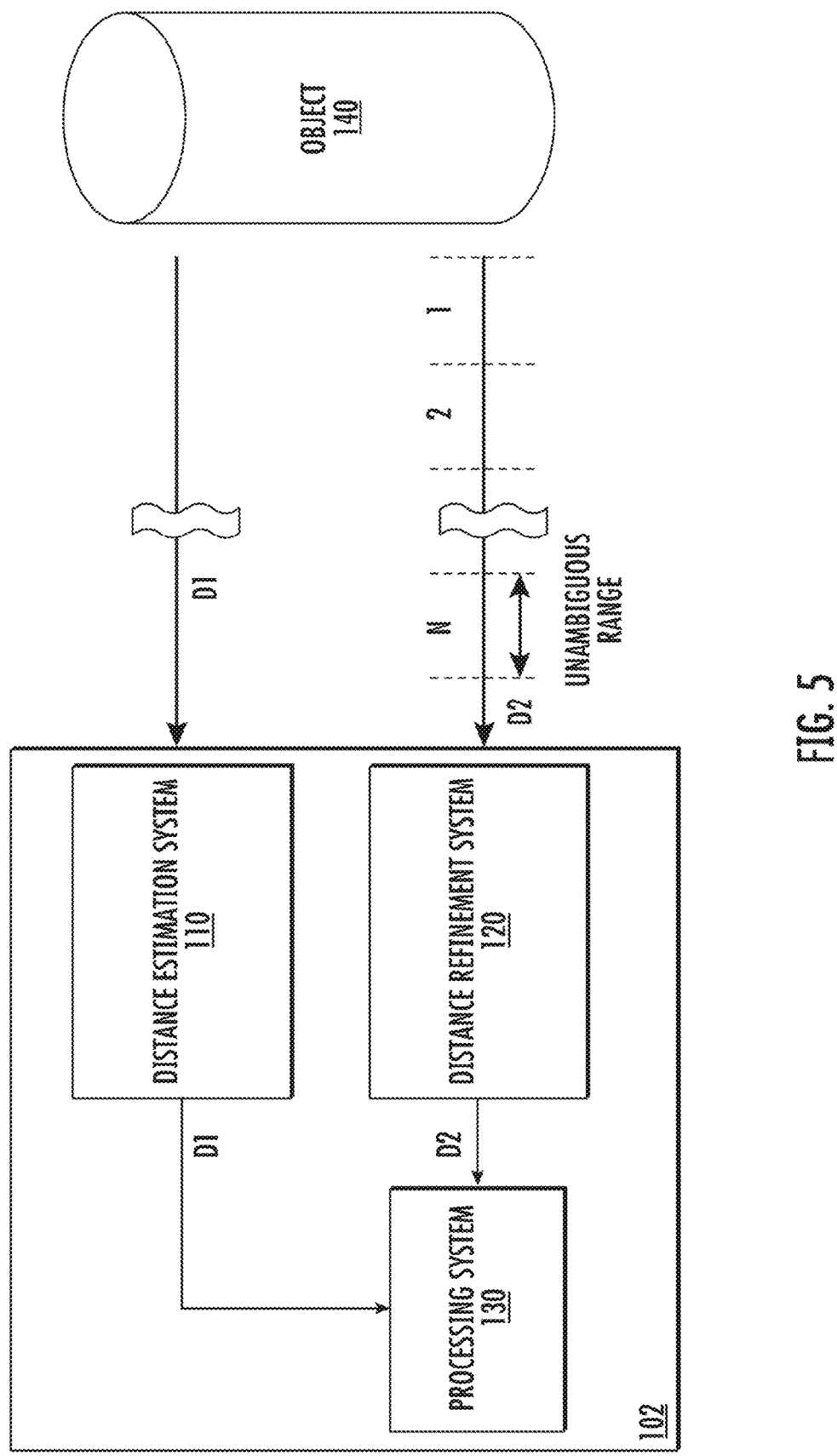
FIG. 5 depicts an example operation of a depth-sensing system according to example aspects of the present disclosure.

FIG. 5 illustrates an example operation of a depth-sensing system. Here, the distance estimation system 110 (e.g., implemented using an RGB camera coupled with a machine-learned model) determines that a distance between the device 102 and the object 140 to be D1. Moreover, the distance refinement system 120 determines that a distance between the device 102 and the object 140 to be D2. The processing system 130 can include one or more computing devices (e.g., one or more processors, one or more hard-wired circuitries, one or more field-programmable gate arrays, other devices, or a combination thereof). The processing system 130 can be configured to receive information representing the first distance D1 and the second distance D2 and determine, based on the first distance D1 and the second distance D2, a third distance between the two points in the environment. A first point of the two points in the environment can represent, for example, a location of an apparatus (e.g., device 102). A second point of the two points in the environment can represent a location of an object 140 in the environment. Based on the first distance D1, a multiplier for an unambiguous range associated with the one or more indirect time-of-flight sensors can be determined. For instance, a third distance can be determined by adding the second distance to a product of the unambiguous range and the multiplier. A difference (e.g., an absolute difference) between (i) a true distance (e.g., actual distance) of the two points in the environment and (ii) the first distance can be larger (e.g., statistically larger) than a difference between (i) the true distance of the two points in the environment and (ii) the third distance. Moreover, in some implementations, the difference between (i) the true distance of the two points in the environment and (ii) the first distance D1 can represent a first error that is smaller than an unambiguous range associated with one or more indirect time-of-flight sensors. The second distance D2 can have a value that is within the unambiguous range. The difference between (i) the true distance of the two points in the environment and (ii) the third distance can represent a second error that is smaller (e.g., statistically smaller) than the first error.

By way of example, based on D1 and known unambiguous range (based on operating frequency of the i-ToF sensors as shown in equation (1)) of the distance refinement system 120, the processing system 130 may determine a long-range and high-depth-resolution distance, $D_{out}$, between the device 102 and the object 140 to be:

$$N = \text{floor}(D_1/(\text{Unambiguous Range})), \quad (2)$$

$$D_{out} = D_2 + N \times (\text{Unambiguous Range}), \quad (3)$$

where N is a closest multiple of the unambiguous range between the device 102 and the object 140, and floor( ) is the floor function that calculates the greatest integer less than or equal to the quotient of a division between D1 and the unambiguous range. The distance $D_{out}$ can be accurate as long as a distance error from the distance estimation system 110 is less than the unambiguous range associated with the distance refinement system 120.

In some implementations, the aliasing issue of an i-ToF sensor may be addressed by operating the i-ToF sensor at two or more different frequencies (e.g., 75 MHz and 50 MHz) that alternate in time. However, even with multi-frequency operations, de-aliasing errors may occur especially when the system SNR gets lower. For example, assuming at 75 MHz and 50 MHz, the unambiguous range is 2 m and 3 m, respectively. The corresponding de-aliased unambiguous range for operating an i-ToF sensor at these two frequencies would be 6 m. When the SNR is high, a difference between the measured distances at 75 MHz and 50 MHz may be small. For example, given a 1-m ground truth at a first measurement, the measured distances by the i-ToF system 122 at 75 MHz and 50 MHz may be 0.9 m and 1.2 m respectively. The computed distance by the depth mapping system 124 may be either 0.9 m or 1.2 m (depending on which frequency data are chosen). However, when the SNR is low, a difference between the measured distances at 75 MHz and 50 MHz may be larger. For example, given a 1-m ground truth at a second measurement under a noisy environment, the measured distances by the i-ToF system 122 at 75 MHz and 50 MHz may be 0.7 m and 1.4 m, respectively. The computed distance by the depth mapping system 124 in this case may become either 4.7 m or 4.4 m (depending on which frequency data are chosen), resulting in a de-aliasing error.

To address de-aliasing errors, the processing system 130 may use the distance determined by the distance estimation system 110 as a reference distance. Using the example above, the processing system 130 may receive a distance measurement of 1 m from the distance estimation system 110 (e.g., D1). If the processing system 130 then receives a distance measurement of either 4.7 m and/or 4.4 m from the distance refinement system 120 (e.g., D2), the processing system 130 may determine that a de-aliasing error has occurred by comparing with D1. If the processing system 130 determines that a de-aliasing error has occurred, the processing system 130 may adjust the distance measurement from the distance refinement system 120 by an integer multiple of the corresponding unambiguous range (e.g., 2×2 m or 1×3 m depending on whether 75 MHz or 50 MHz is chosen). Accordingly, the depth-sensing system may detect and correct de-aliasing errors.

Figure 6:
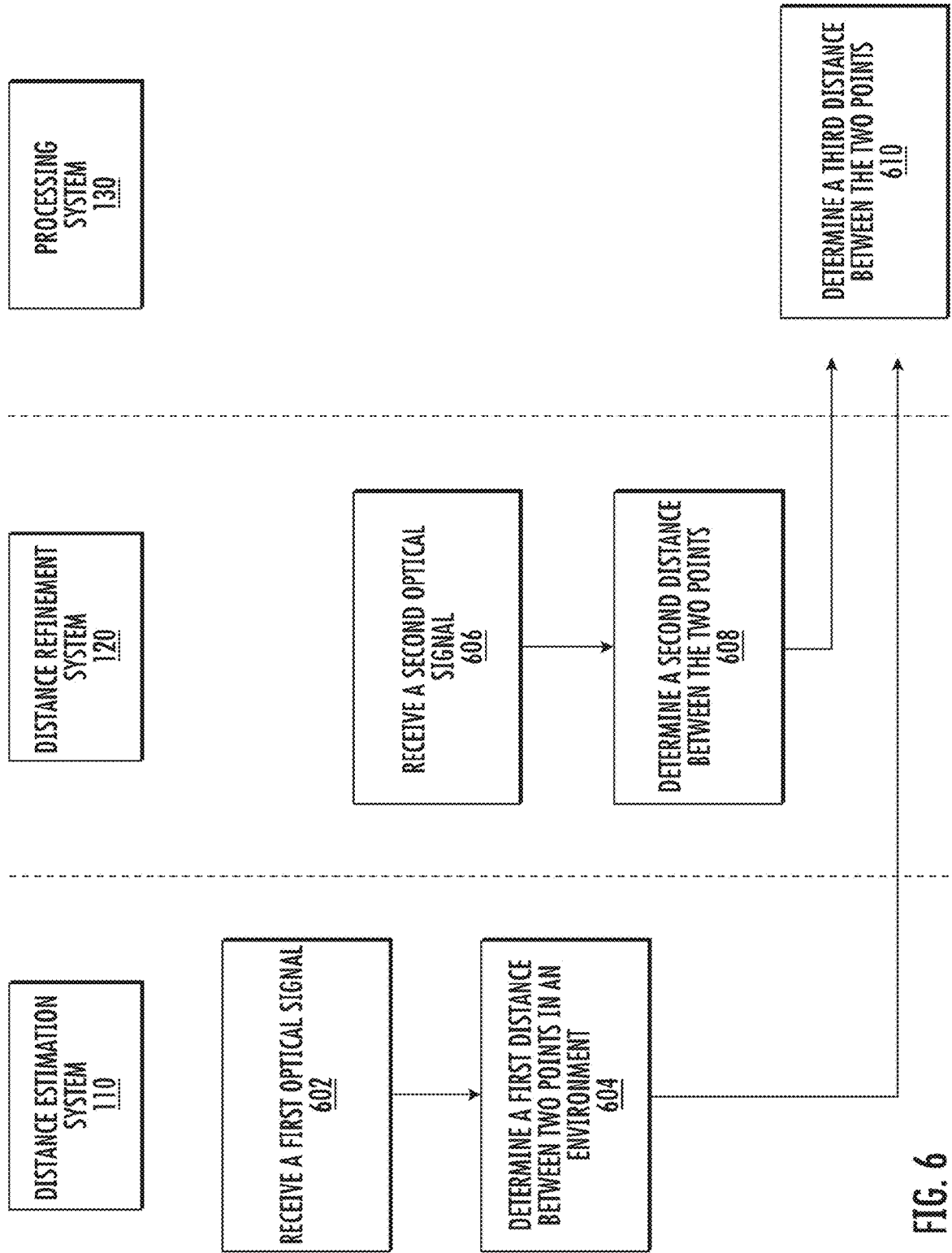
FIG. 6 depicts a flow chart of an example process according to example aspects of the present disclosure.

FIG. 6 shows an example process of determining a long-range and high-depth-resolution distance using a depth-sensing system (e.g., the depth-sensing system 100).

The depth-sensing system receives a first optical signal (602). The first optical signal can be received by a sensor system (e.g., of the depth-sensing system). For example, an RGB camera of the distance estimation system 110 may capture an image of an object in an environment. The depth-sensing system determines a first distance between two points in the environment (604). The first distance between two points in the environment can be determined by the sensor system and based on the first optical signal. For example, a machine-learned model 204 of the distance estimation system 110 may use a portion of the image captured by the RGB camera 202 to generate an output that represents a distance between a device 102 and an object 140. A depth mapping system 114 may use the output from the machine-learned model to determine a long-range but higher-error distance between a device 102 and an object 140.

The depth-sensing system receives a second optical signal (606). The second optical signal can be received by one or more indirect time-of-flight sensors separate from the sensor system. For example, one or more i-ToF sensors of the distance refinement system 120 may detect light reflected from an object in an environment. The depth-sensing system determines a second distance between two points in the environment (608). The second distance between the two points in the environment can be determined by the one or more indirect time-of-flight sensors and based on the second optical signal. For example, the depth mapping system 124 of the distance refinement system 120 may use phase difference between a transmitted light and a reflected light to determine a distance within an unambiguous range.

The depth-sensing system determines a third distance between two points (610). One or more computing devices of the depth-sensing system can receive information representing the first distance and the second distance. The third distance between the two points in the environment can be determined by the one or more computing devices and based on the first distance and the second distance. A difference (e.g., an absolute difference) between (i) a true distance of the two points in the environment and (ii) the first distance can be larger (e.g., statistically larger) than a difference between (i) the true distance of the two points in the environment and (ii) the third distance. For example, the processing system 130 may use the first distance determined by the distance estimation system 110, the unambiguous range associated with the operating frequencies of the i-ToF sensors, and the second distance determined by the distance refinement system 120 to determine a long-range and high-depth-resolution distance (e.g., $D_{out}$ as described in reference to FIG. 5) between the device 102 and the object 140.

Figure 7:
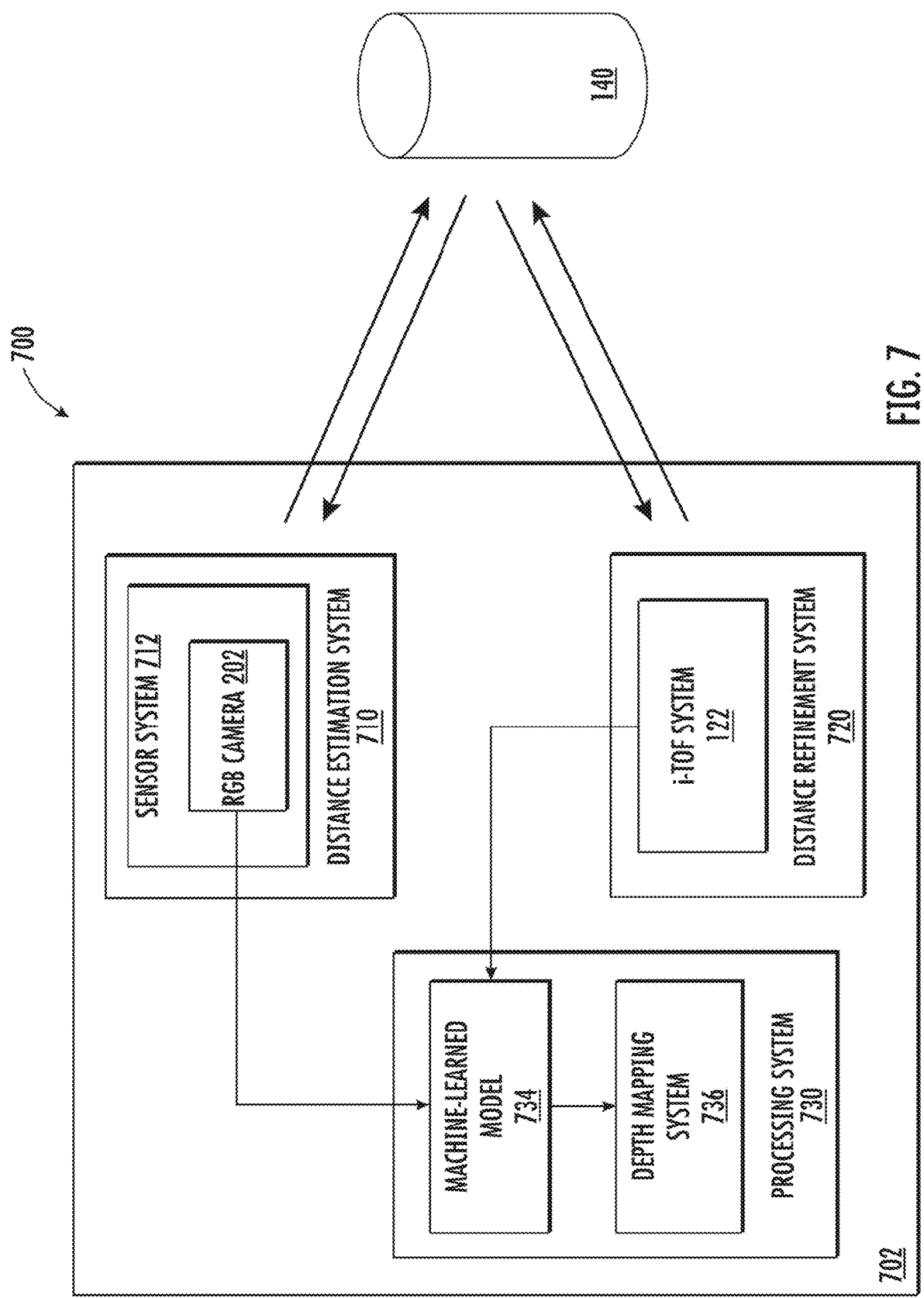
FIG. 7 depicts a block diagram of an example depth-sensing system according to example aspects of the present disclosure.

FIG. 7 shows a depth-sensing system 700 for determining a distance between a device 702 and an object 140 in an environment using a machine-learned model trained with sensor fusion. The device 702 may be a mobile device (e.g., smartphone, tablet, wearable device, vehicle, drone, etc.) or a stationary device (e.g., surveillance system, robotic arm, etc.). The device 702 includes a distance estimation system 710, a distance refinement system 720, and a processing system 730.

The distance estimation system 710 is configured to receive an optical signal, and based on the optical signal, provide an electrical signal (e.g., a digital image) that can be used to estimate a distance between the device 702 and the object 140. The distance estimation system 710 may include a sensor system 712. The sensor system 712 may be implemented using an RGB camera 202. The sensor system 712 may also be implemented using a stereo camera 212, or a structured light system 222, or a d-ToF sensor 232, or an i-ToF sensor 242, or a motion estimator 252, or a combination of any of the sensors mentioned above. In this way, the distance estimation system 710 can be configured to receive a first optical signal and generate, based on the first optical signal, a first electrical signal for determining a first distance between two points in an environment.

The distance refinement system 720 is configured to receive an optical signal, and based on the optical signal, provide an electrical signal (e.g., quadrature amplitudes) that can be used to determine a distance between the device 702 and the object 140. The distance refinement system 720 may include one or more i-ToF systems 122. In this way, the distance refinement system 720 can be configured to receive a second optical signal and generate, based on the second optical signal, a second electrical signal for determining a second distance between the two points in the environment.

The processing system 730 may combine electrical signals from both the distance estimation system 710 and the distance refinement system 720, and determine a distance between the device 702 and the object 140 with high accuracy and long range. The processing system 730 may include a machine-learned model 734 and a depth mapping system 736. The processing system 730 may be implemented using hardware circuitry (e.g., ASIC, FPGA), a lookup table, one or more processors (e.g., MCU, CPU, GPU, TPU) with software, or any other suitable ways.

The processing system 730 (e.g., including one or more computing devices) can be configured to receive the first electrical signal and the second electrical signal, provide input information representing the first electrical signal and the second electrical signal to a machine-learned model, receive output information representing a third distance between the two points in the environment, and determine the third distance between the two points in the environment. A maximum value of the second distance can be less than an unambiguous range associated with the one or more indirect time-of-flight sensors, and a maximum value of the third distance can be more than the unambiguous range associated with the one or more indirect time-of-flight sensors.

For instance, the machine-learned model 734 has been trained to receive a signal from the distance estimation system 710 (e.g., a portion of the digital image that includes the object 140 in the environment captured by the RGB camera 202) and a signal from the distance refinement system 720 (e.g., a portion of the quadrature amplitudes that includes the object 140 in the environment captured by the i-ToF system 122) as a combined input, and to generate an output that represents a distance between the device 702 and the object 140. In some implementations, the machine-learned model 734 may be a convolutional neural network model, a deep neural network model, or any other suitable machine-learned models. For example, the machine-learned model 734 may be trained to output distance data using RGB image data of an object and corresponding phase data generated by i-ToF sensors operating at a specific frequency (e.g., 300 MHz). Since the sensor (e.g., RGB camera) of the distance estimation system 710 may provide a higher-error but longer range distance estimate between the device 702 and the object 140, and the sensor (e.g., i-ToF sensors) of distance refinement system 720 may provide a lower-error distance within the unambiguous range, the machine-learned model 734 may be trained to combine information from both the distance estimation system 710 and the distance refinement system 720 to determine a distance between the device 702 and the object 140 with high accuracy and long range.

The depth mapping system 736 receives the output from the machine-learned model 734 and determines the distance between the device 702 and the object 140. The depth mapping system 736 may be implemented using hardware circuitry (e.g., ASIC, FPGA), a lookup table, one or more processors (e.g., MCU, CPU, GPU, TPU) with software, or any other suitable ways. In some implementations, the depth mapping system 736 may be implemented as part of the machine-learned model 734 (e.g., one or more output layers of the machine-learned model 734).

Figure 8:
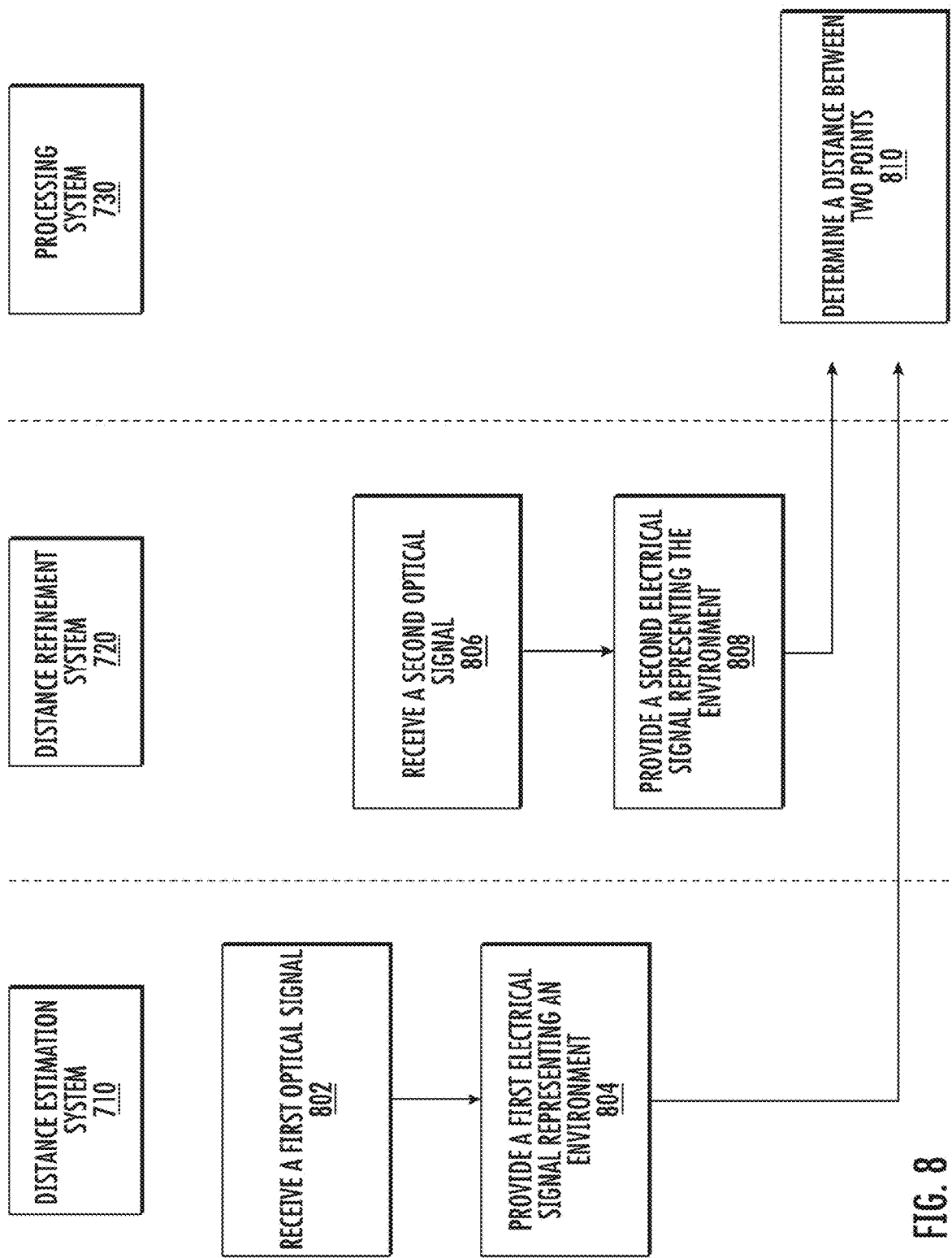
FIG. 8 depicts a flow chart of an example process according to example aspects of the present disclosure.

FIG. 8 shows an example process of determining a long-range and high-depth-resolution distance using a depth-sensing system (e.g., the depth-sensing system 700).

The depth-sensing system receives a first optical signal (802). For example, an RGB camera of the distance estimation system 710 may capture an image of an object in an environment. The depth-sensing system provides a first electrical signal representing the environment (804). For example, the distance estimation system 710 may provide information representing at least a portion of the image and/or any associated metadata to the processing system 730.

The depth-sensing system receives a second optical signal (806). For example, one or more i-ToF sensors of the distance refinement system 720 may detect light reflected from an object in an environment. The depth-sensing system provides a second electrical signal representing the environment (808). For example, the i-ToF system 122 of the distance refinement system 720 may output information to the processing system 730 that represents a phase difference between a transmitted light by the device 702 and a reflected light from the object 140.

The depth-sensing system determines a distance between two points (810). For example, the processing system 730 may receive (i) from the distance estimation system 710 information representing at least a portion of the image and/or any associated metadata and (ii) from the distance refinement system 720 information that represents a phase difference between a transmitted light by the device 702 and a reflected light from the object 140. The processing system 730 may fuse the received information and generate an input (e.g., one or more multi-dimension vectors) for the machine-learned model 734. The machine-learned model 734 may use the input to generate an output that represents the distance between the device 720 and the object 140. The depth mapping system 736 may use the output from the machine-learned model 734 to determine the distance between the device 720 and the object 140 (e.g., $D_{out}$ as described in reference to FIG. 5).

Figure 9:
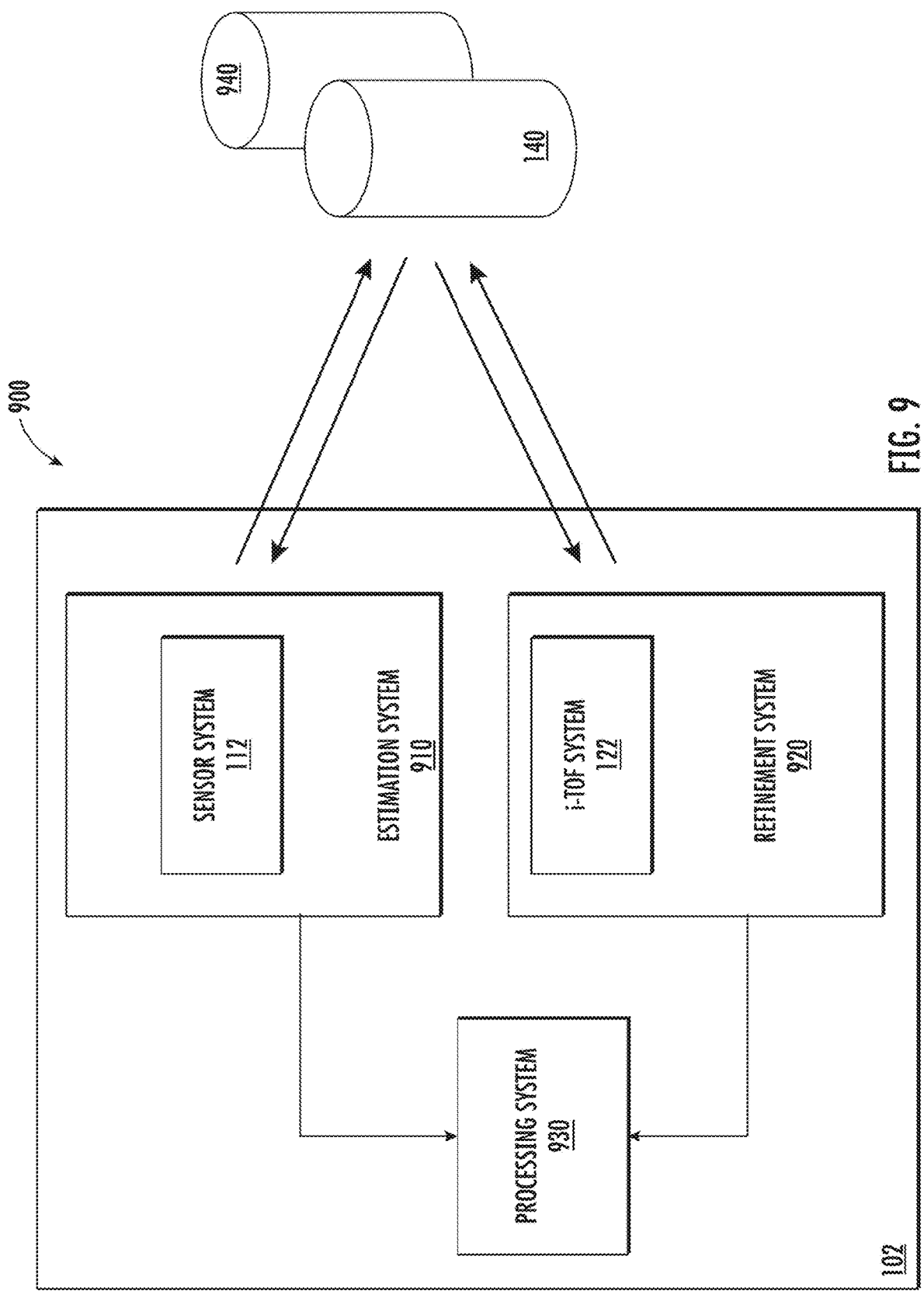
FIG. 9 depicts an example system according to example aspects of the present disclosure.

FIG. 9 shows a system 900 for determining one or more characteristics of an object 140 in an environment. Generally, the system 900 includes an estimation system 910, a refinement system 920, and a processing system 930. The estimation system 910 is configured to use the sensor system 112 to determine an output that represents an estimate of one or more characteristics of an object 140 in an environment. The refinement system 920 is configured to use the i-ToF system 122 to determine an output that represents a refinement of the one or more characteristics of the object 140. The processing system 930 is configured to receive outputs from the estimate system 910 and the refinement system 920 to determine a more accurate (e.g., a value with higher certainty, a value with lower error bounds, etc.) value for the one or more characteristics. Example characteristics associated with an object 140 may include a distance between the object 140 and the device 102, an edge of the object 140, a recognition of the object 140, a classification of the object 140, a motion of the object 140, and any other application characteristics.

For example, the depth-sensing system 100 in reference to FIG. 1 can be one example of the system 900, where the distance estimation system 110 can be an example of the estimation system 910, the distance refinement system 120 can be an example of the refinement system 920, and the processing system 130 can be an example of the processing system 930.

As another example, the system 900 may be used to distinguish between the object 140 and another object 940 that partially overlaps with the object 140. Here, the estimation system 910 may use an RGB camera coupled with a machine-learned model to determine an output that represents an edge of the object 140. Since the object 940 is partially overlapped with the object 140 in the RGB image, the estimation system 910 may assign an uncertainty value to each pixel of a group of pixels that are adjacent to the object 140, where the uncertainty value may represent a probability of the corresponding pixel being the object 140. The refinement system 920 may use the i-ToF system 122 to determine relative a depth difference between the object 140 and the object 940. The processing system 930 may use outputs from both the estimation system 910 and the refinement system 920 to determine whether the adjacent pixels are part of the object 140.

Figure 10:
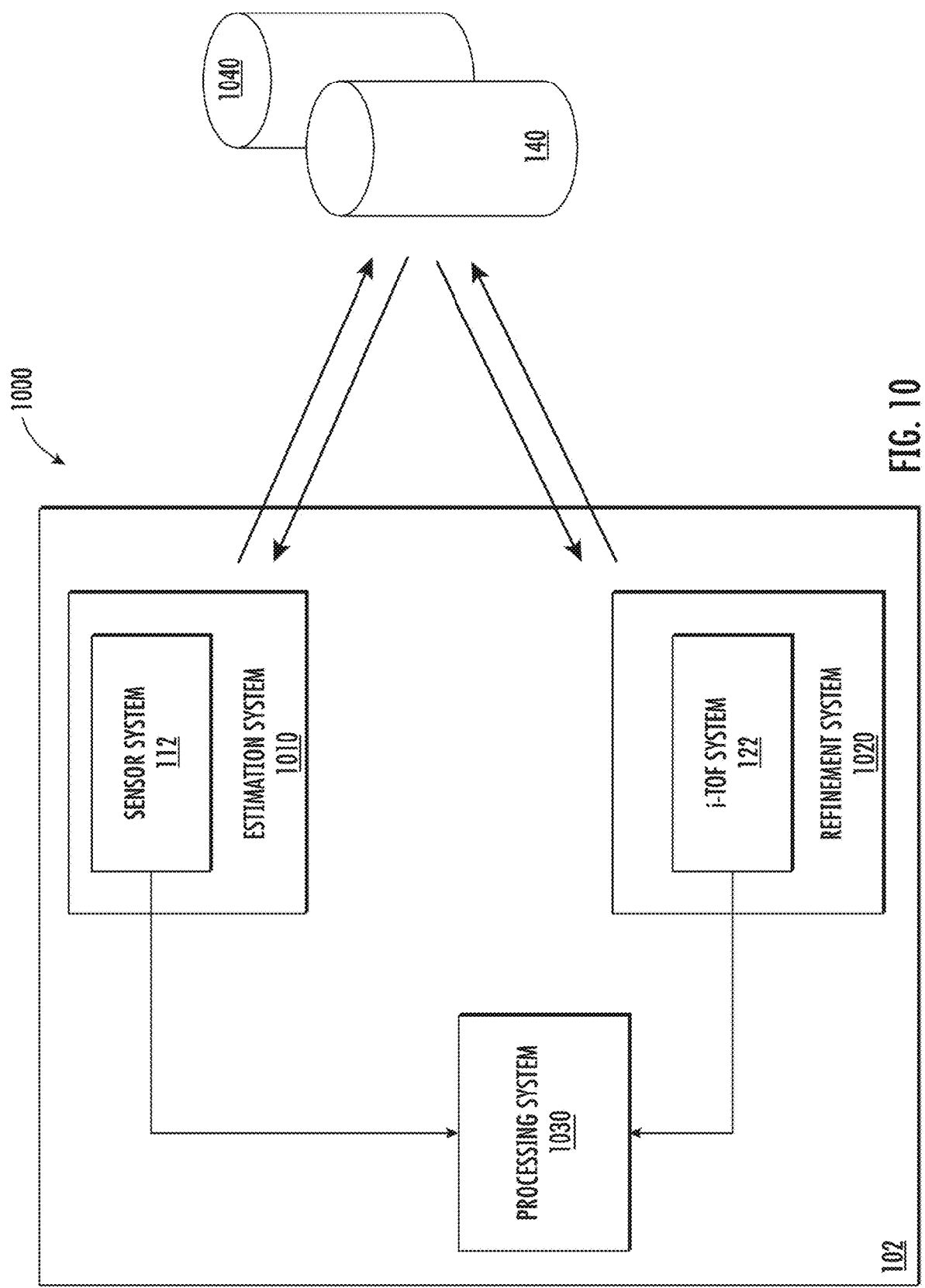
FIG. 10 depicts an example system according to example aspects of the present disclosure.

FIG. 10 shows another system 1000 for determining one or more characteristics of an object 140 in an environment. Generally, the system 1000 includes an estimation system 1010, a refinement system 1020, and a processing system 1030. The estimation system 1010 is configured to use the sensor system 112 to provide an output that can be used to determine an estimate of one or more characteristics of an object 140 in an environment. The refinement system 1020 is configured to use the i-ToF system 122 to provide an output that can be used to determine a refinement of the one or more characteristics of the object 140. The processing system 1030 is configured to receive outputs from the estimation system 1010 and the refinement system 1020 to determine a value for the one or more characteristics. For example, the depth-sensing system 700 in reference to FIG. 7 can be one example of the system 1000, where the distance estimation system 710 can be an example of the estimation system 1010, the distance refinement system 720 can be an example of the refinement system 1020, and the processing system 730 can be an example of the processing system 1030.

In this way, the systems 900 and/or 1000 of FIGS. 9 and 10, can include an estimation system 910, 1010 (e.g., including a sensor system 112) configured to receive a first signal and determine, based on the first signal, a first value for a characteristic associated with a target object in an environment. The systems 910, 1010 can include a refinement system 920, 1020 (e.g., including one or more indirect time-of-flight sensors) configured to receive a second signal and determine, based on the second signal, a second value for the characteristic associated with the target object in the environment. The systems 910, 1010 can include a processing system 930, 1030 (e.g., comprising one or more computing devices) configured to receive information representing the first value and the second value and determine, based on the first value and the second value, a third value for the characteristic associated with the target object in the environment. A difference (e.g., an absolute difference) between (i) a true value for the characteristic associated with the target object in the environment and (ii) the first value can be larger (e.g., statistically larger) than a difference between (i) true value for the characteristic and (ii) the third value.

The following provides example implementations of the systems and methods described herein. These implementations are provided for example illustration purposes and are not intended to be limiting.

In some implementations, the systems and methods described herein can be utilized by a robotic platform to improve the functions and operations of the robotic platform. The robotic platform can include any of the systems or perform any of the methods/processes described herein and depicted in the figures.

In some embodiments, the robotic platform can include an autonomous vehicle. The autonomous vehicle can include an onboard computing system for autonomously perceiving the vehicle's environment and controlling the motion of the vehicle through the environment. The autonomous vehicle can include a depth-sensing system as described herein. The depth-sensing system can help improve the perception function of the autonomous vehicle. For example, the depth-sensing system can allow the autonomous vehicle to more accurately classify objects and predict their behavior, such as by a vehicle computing system. This can be used to distinguish between a first object (e.g., a first vehicle) within the surrounding environment of the autonomous vehicle and a second object (e.g., a second vehicle) that partially overlaps with the first object. An estimation system of the depth-sensing system can use a first sensor (e.g., an RGB camera that, in some implementations, can be coupled with a machine-learned model) to determine an output that represents an edge of the first object. Since the second object is at least partially overlapped with the first object (e.g., in the RGB image), the estimation system may assign an uncertainty value to each pixel of a group of pixels that are adjacent to the object (e.g., a probability of the corresponding pixel being the first object). A refinement system can use a second sensor system (e.g., a i-ToF system) to determine a relative depth difference between the first object and the second object. A processing system may use outputs from both the estimation system and the refinement system to determine whether the adjacent pixels are part of the first object. By doing so, the autonomous vehicle can determine the boundaries of the first object and/or the second object.

The autonomous vehicle can classify the first object (e.g., as vehicle, etc.) based on the depth difference, the determined distance of the first object, and/or the determination of pixel(s) as belonging to the first object. For example, this can allow the autonomous vehicle to better understand the shape of the object and, thus, semantically label the object as a particular type. Moreover, by determining the identification and/or type of object, the autonomous vehicle can better predict the motion of the object. For example, the autonomous vehicle can better predict the motion trajectory of the first object based on the type of object. In some implementations, the autonomous vehicle can determine that the object is a dynamic object that could move within the surrounding environment (e.g., a vehicle) and/or a static object that may remain stationary within the surrounding environment (e.g., a lamp post). In some implementations, the autonomous vehicle can determine that the object may move in a particular manner based on the type of object. For example, a vehicle may be more likely to travel within the lane boundaries of a road than a bicycle.

The robotic platform (e.g., an autonomous vehicle) can determine a more accurate characteristic (e.g., distance between the object and the autonomous vehicle) based, for example, on the processes described in FIGS. 6 and 8. The determined distance can allow for better localization of the robotic platform within its surrounding environment. For example, an autonomous vehicle can determine, based on a first distance determined via an estimation system and a second distance determined via the refinement system, a third distance between two points. The two points can include the robotic platform and an object that can be utilized for localization. For example, an autonomous vehicle can at least partially localize itself within its environment based on a landmark. The autonomous vehicle can determine a more accurate distance between the autonomous vehicle and a landmark (e.g., a building, statue, intersection, etc.). This can allow the autonomous vehicle (or a remote system) to better determine the position/location of the autonomous vehicle and plan its motion through the environment.

In some implementations, the robotic platform can include an aerial robotic platform such as, for example, a drone. The drone can include a depth-sensing system as described herein and depicted in the figures. The depth-sensing system can improve the operation and function of the drone. This can include, for example, the precision and accuracy for landing the drone in a landing area or identifying an area for imaging. By way of example, the drone can receive, via a distance estimation system, a first optical signal and determine a first distance between the drone and a landing/imaging area in an environment based on the first optical signal. The drone can receive, via a distance-refinement system, a second optical signal and determine a second distance between the drone and the landing/imaging area based on the second optical signal. The drone can determine, via a processing system, a third distance between the drone and the landing/imaging area based on the first distance and the second distance. The third distance can be a more accurate determination of the distance between the drone and the landing/imaging area than the first distance. This can allow the drone to more accurately land and/or focus its imaging sensors (e.g., onboard cameras) on the area to be imaged.

In another example, the robotic platform can be associated with a manufacturing application and/or a medical application. By way of example, the robotic platform can include a robotic arm. The robotic arm can be an electro-mechanical arm configured to help assemble at least a portion of a manufactured item (e.g., a hardware computing architecture including a plurality of electronic devices). The robotic arm can include a depth-sensing system as described herein and depicted in the figures. Using the depth-sensing system, the robotic arm can determine a more precise position of an element (e.g., a microprocessor) to be included on an item (e.g., a circuit board). For example, the robotic arm (e.g., an associated computing system) can receive, via a distance estimation system, a first optical signal and determine a first distance between the robotic arm (or a portion thereof) and a placement position based on the first optical signal. The robotic arm can receive, via a distance-refinement system, a second optical signal and determine a second distance between the robotic arm (or a portion thereof) and a placement position based on the second optical signal. The robotic arm can determine, via a processing system, a third distance between the robotic arm and the placement position based on the first distance and the second distance. The third distance can be a more accurate determination of the distance between the robotic arm and the placement position than the first distance. This can allow the robotic arm to assemble the manufactured item more efficiently and accurately.

In some implementations, the systems and methods described herein can be utilized by a user device to improve the function and operations of the user device. The user device can be, for example, a mobile device, tablet, wearable headset, etc. The user device can include a depth-sensing system and perform the methods/processes described herein and depicted in the figures.

By way of example, the user device (e.g., a mobile device) can include one or more sensor systems. The sensor system(s) can include a first sensor (e.g., an RGB camera) and/or a second sensor (e.g., i-ToF sensor(s)). For example, the sensor system can include one or more cameras embedded in a mobile device. Additionally, or alternatively, the sensor system can include one or more indirect time-of-flight sensors that include a three-dimensional sensor array embedded in the mobile device. In some implementations, the one or more cameras and the three-dimensional sensor array can be embedded in a backside of the mobile device that is on an opposite side of a screen of the mobile device. Additionally, or alternatively, the one or more cameras and the three-dimensional sensor array can be embedded in a frontside of the mobile device that is on a same side of a screen of the mobile device.

The sensor system(s) can be utilized by the depth-sensing system to improve the operations and functions of the user device. This can include the imaging of an object, the launch/function of a software application, access to a user device, etc. For example, the user device can receive, via a distance estimation system, a first optical signal and determine a first distance between the user device and an object based on the first optical signal. The user device can receive, via a distance-refinement system, a second optical signal and determine a second distance between the user device and an object based on the second optical signal. The user can determine, via a processing system, a third distance between the user device and the object based on the first distance and the second distance, as described herein. The user device can perform one or more functions or operations based on the third distance. For instance, the user device can perform an access function (e.g., to unlock access to the mobile phone) based on distance to an authorized user's face or a gesture by an authorized user. In another example, the user device can focus a camera of the user device based on a determined distance between the user device and/or an object to be imaged (e.g., a user, etc.). Additionally, or alternatively, the user device can launch an application and/or initiate an operation of a particular function based on the determined distance. For example, the user can perform a gesture associated with launching an imaging application on a user device. In response, the user device can launch the imaging application. The user device can initiate a filter function based on the determined distance. The filter function can be applied to the object to be imaged in a more accurate manner given the distance determined by the user device.

In some implementations, the user device can be associated with augmented reality (AR) and virtual reality (VR). For instance, the technology described herein can allow for more immersive augmented reality (AR) and virtual reality (VR) experiences. For example, a user device can utilize the depth-sensing systems and processes described herein to determine a more accurate distance between a user device (and the user thereof) and an object within the augmented reality. The user device can perform one or more actions based at least in part on the determined distance between the user device and the object. For example, the user device can render elements within the augmented reality around the object and/or render the virtual environment based on the determined distance.

In some implementations, the systems and methods described herein can be utilized within a surveillance system. For example, a surveillance system can be configured to perform one or more operations based on a distance to an object and/or a detection of the object. The surveillance system can receive, via a distance estimation system, a first optical signal and determine a first distance between the surveillance system and an object (e.g., a person) based on the first optical signal. The surveillance system can receive, via a distance-refinement system, a second optical signal and determine a second distance between the surveillance system and an object based on the second optical signal. The surveillance system can determine, via a processing system, a third distance between the surveillance system and the object based on the first distance and the second distance, as described herein. The surveillance system can perform one or more functions or operations based on the third distance. For instance, the surveillance system can perform an access function (e.g., to deny access) based on distance to the object (e.g., an intruder) and/or movement thereof.

Figure 12:
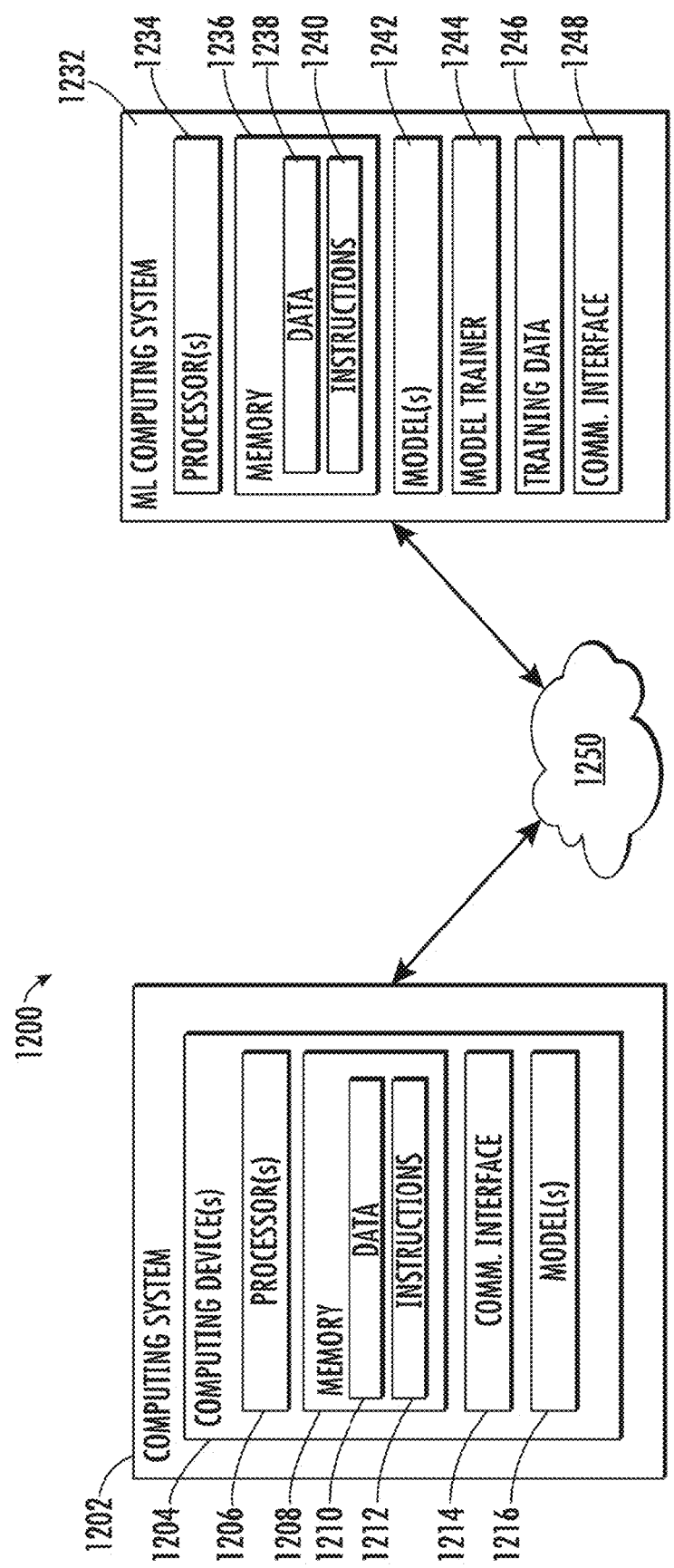
FIG. 12 depicts an example computing system components and devices according to example aspects of the present disclosure.

FIG. 12 depicts a block diagram of an example computing system 1200 according to example embodiments of the present disclosure. The example system 1200 includes a computing system 1202 and a machine learning computing system 1232 that are communicatively coupled over a network 1250.

In some implementations, the computing system 1202 can perform the operations and functions of the various computing devices described herein. For example, the computing system 1202 can represent a depth-sensing system, estimation system, refinement system, processing systems, and/or other systems described herein and perform the functions of such systems. The computing system 1202 can include one or more distinct physical computing devices.

The computing system 1202 can include one or more computing devices 1204. The one or more computing devices 1204 can include one or more processors 1206 and a memory 1208. The one or more processors 1206 can be any suitable processing device (e.g., a processor core, a microprocessor, an ASIC, a FPGA, a controller, a microcontroller, etc.) and can be one processor or a plurality of processors that are operatively connected. The memory 1208 can include one or more non-transitory computer-readable storage media, such as RAM, ROM, EEPROM, EPROM, one or more memory devices, flash memory devices, etc., and combinations thereof.

The memory 1208 can store information that can be accessed by the one or more processors 1206. For instance, the memory 1208 (e.g., one or more non-transitory computer-readable storage mediums, memory devices) can store data 1210 that can be obtained, received, accessed, written, manipulated, created, and/or stored. The data 1210 can include, for instance, data indicative of one or more distances, objects, signals, errors, ranges, model inputs, model outputs, and/or any other data and/or information as described herein. In some implementations, the computing system 1202 can obtain data from one or more memory device(s) that are remote from the system 1202.

The memory 1208 can also store computer-readable instructions 1212 that can be executed by the one or more processors 1206. The instructions 1212 can be software written in any suitable programming language or can be implemented in hardware. Additionally, or alternatively, the instructions 1212 can be executed in logically and/or virtually separate threads on processor(s) 1206.

For example, the memory 1208 can store instructions 1212 that when executed by the one or more processors 1206 cause the one or more processors 1206 to perform any of the operations and/or functions described herein, including, for example, the operations and functions of any of the systems described herein, one or more portions of the methods/processes described herein, and/or any other functions or operations.

According to an aspect of the present disclosure, the computing system 1202 can store or include one or more machine-learned models 1216. As examples, the machine-learned models 1216 can be or can otherwise include various machine-learned models such as, for example, neural networks (e.g., deep neural networks), support vector machines, decision trees, ensemble models, k-nearest neighbors models, Bayesian networks, or other types of models including linear models and/or non-linear models. Example neural networks include feed-forward neural networks, recurrent neural networks (e.g., long short-term memory recurrent neural networks), convolutional neural networks, or other forms of neural networks.

In some implementations, the computing system 1202 can receive the one or more machine-learned models 1216 from the machine learning computing system 1232 over network 1250 and can store the one or more machine-learned models 1216 in the memory 1208. The computing system 1202 can then use or otherwise implement the one or more machine-learned models 1216 (e.g., by processor(s) 1206). In particular, the computing system 1202 can implement the machine learned model(s) 1216 to output distance data. The distance data can be indicative of a depth estimation. For example, the machine learned model(s) 1216 can determine a depth estimation as determined by multiple images captured by one or more image sensors over time. The machine learned model(s) 1216 can receive at least a portion of an image that includes an object in an environment and can output a depth estimation.

In some implementations, the input to the machine learned model(s) 1216 can be a fused input. For instance, the fused input can be based on a signal from the distance estimation system (e.g., a portion of the digital image that includes an object in the environment captured by a RGB camera) and a signal from a distance refinement system (e.g., a portion of the quadrature amplitudes that includes the object in the environment captured by an i-ToF system). The machine learned model(s) 1216 can be configured to receive the fused input, and to generate an output that represents a distance between the computing system 1202 and an object.

The machine learning computing system 1232 includes one or more processors 1234 and a memory 1236. The one or more processors 1234 can be any suitable processing device (e.g., a processor core, a microprocessor, an ASIC, a FPGA, a controller, a microcontroller, etc.) and can be one processor or a plurality of processors that are operatively connected. The memory 1236 can include one or more non-transitory computer-readable storage media, such as RAM, ROM, EEPROM, EPROM, one or more memory devices, flash memory devices, etc., and combinations thereof.

The memory 1236 can store information that can be accessed by the one or more processors 1234. For instance, the memory 1236 (e.g., one or more non-transitory computer-readable storage mediums, memory devices) can store data 1238 that can be obtained, received, accessed, written, manipulated, created, and/or stored. The data 1238 can include, for instance, any of the data and/or information as described herein. In some implementations, the machine learning computing system 1232 can obtain data from one or more memory device(s) that are remote from the system 1232.

The memory 1236 can also store computer-readable instructions 1240 that can be executed by the one or more processors 1234. The instructions 1240 can be software written in any suitable programming language or can be implemented in hardware. Additionally, or alternatively, the instructions 1240 can be executed in logically and/or virtually separate threads on processor(s) 1234.

For example, the memory 1236 can store instructions 1240 that when executed by the one or more processors 1234 cause the one or more processors 1234 to perform any of the operations and/or functions described herein, including, for example, the operations and functions of any of the systems described herein, one or more portions of the methods/processes described herein, and/or any other functions or processes.

In some implementations, the machine learning computing system 1232 includes one or more server computing devices. If the machine learning computing system 1232 includes multiple server computing devices, such server computing devices can operate according to various computing architectures, including, for example, sequential computing architectures, parallel computing architectures, or some combination thereof.

Additionally, or alternatively, to the model(s) 1216 at the computing system 1202, the machine learning computing system 1232 can include one or more machine-learned models 1242. As examples, the machine-learned models 1242 can be or can otherwise include various machine-learned models such as, for example, neural networks (e.g., deep neural networks), support vector machines, decision trees, ensemble models, k-nearest neighbors models, Bayesian networks, or other types of models including linear models and/or non-linear models. Example neural networks include feed-forward neural networks, recurrent neural networks (e.g., long short-term memory recurrent neural networks), convolutional neural networks, or other forms of neural networks.

As an example, the machine learning computing system 1232 can communicate with the computing system 1202 according to a client-server relationship. For example, the machine learning computing system 1232 can implement the machine-learned models 1242 to provide a web service to the computing system 1202. For example, the web service can provide the functions and operations of the depth-sensing systems and/or other systems described herein (e.g., for determining a distance between two points, a device/system and an object, etc.).

Thus, machine-learned models 1216 can be located and used at the computing system 1202 and/or machine-learned models 1242 can be located and used at the machine learning computing system 1232.

In some implementations, the machine learning computing system 1232 and/or the computing system 1202 can train the machine-learned models 1216 and/or 1242 through use of a model trainer 1244. The model trainer 1244 can train the machine-learned models 1216 and/or 1242 using one or more training or learning algorithms. One example training technique is backwards propagation of errors. In some implementations, the model trainer 1244 can perform supervised training techniques using a set of labeled training data. In other implementations, the model trainer 1244 can perform unsupervised training techniques using a set of unlabeled training data. The model trainer 1244 can perform a number of generalization techniques to improve the generalization capability of the models being trained. Generalization techniques include weight decays, dropouts, or other techniques.

In particular, the model trainer 1244 can train a machine-learned model 1216 and/or 1244 based on a set of training data 1246. The training data 1246 can include, for example, labelled input data (e.g., from RGB and/or i-ToF sensors) and/or fused sensor data indicative of distance information. The model trainer 1244 can be implemented in hardware, firmware, and/or software controlling one or more processors.

The computing system 1202 can also include a communication interface 1214 used to communicate with one or more systems or devices, including systems or devices that are remotely located from the computing system 1202. The communication interface 1214 can include any circuits, components, software, etc. for communicating with one or more networks 1250. In some implementations, the communication interface 1214 can include, for example, one or more of a communications controller, receiver, transceiver, transmitter, port, conductors, software and/or hardware for communicating data. Similarly, the machine learning computing system 1232 can include a communication interface 1248.

The network(s) 1250 can be any type of network or combination of networks that allows for communication between devices. In some embodiments, the network(s) can include one or more of a local area network, wide area network, the Internet, secure network, cellular network, mesh network, peer-to-peer communication link and/or some combination thereof and can include any number of wired or wireless links. Communication over the network(s) can be accomplished, for instance, via a network interface using any type of protocol, protection scheme, encoding, format, packaging, etc.

FIG. 12 illustrates one example computing system 1200 that can be used to implement the present disclosure. Other computing systems can be used as well. For example, in some implementations, the computing system 1202 can include the model trainer 1244 and the training dataset 1246. In such implementations, the machine-learned models 1216 can be both trained and used locally at the computing system 1202. As another example, in some implementations, the computing system 1202 is not connected to other computing systems.

In addition, components illustrated and/or discussed as being included in one of the computing systems 1202 or 1232 can instead be included in another of the computing systems 1202 or 1232. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implemented tasks and/or operations can be performed sequentially or in parallel. Data and instructions can be stored in a single memory device or across multiple memory devices.

Various means can be configured to perform the methods, operations, and processes described herein. For example, any of the systems (e.g., estimation system, refinement system, processing system, depth sensing system) can include unit(s) and/or other means for performing their operations and functions described herein. In some implementations, one or more of the units may be implemented separately. In some implementations, one or more units may be a part of or included in one or more other units. These means can include processor(s), microprocessor(s), graphics processing unit(s), logic circuit(s), dedicated circuit(s), application-specific integrated circuit(s), programmable array logic, field-programmable gate array(s), controller(s), microcontroller(s), and/or other suitable hardware. The means can also, or alternately, include software control means implemented with a processor or logic circuitry, for example. The means can include or otherwise be able to access memory such as, for example, one or more non-transitory computer-readable storage media, such as random-access memory, read-only memory, electrically erasable programmable read-only memory, erasable programmable read-only memory, flash/other memory device(s), data register(s), database(s), and/or other suitable hardware.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An apparatus comprising:
    a distance-estimation system comprising a sensor system, the distance-estimation system configured to:
        receive a first optical signal; and
        determine, based on the first optical signal, a first distance between two points in an environment;
    a distance-refinement system comprising one or more indirect time-of-flight sensors, the distance-refinement system configured to:
        receive a second optical signal; and
        determine, based on the second optical signal, a second distance between the two points in the environment; and
    a processing system comprising one or more computing devices, the processing system configured to:
        receive information representing the first distance and the second distance; and
        determine, based on the first distance and the second distance, a third distance between the two points in the environment, wherein determining the third distance between the two points in the environment comprises:
            determining, based on the first distance, a multiplier for an unambiguous range associated with the one or more indirect time-of-flight sensors; and
            determining the third distance by adding the second distance to a product of the unambiguous range and the multiplier;
    wherein a difference between (i) a true distance of the two points in the environment and (ii) the first distance is larger than a difference between (i) the true distance of the two points in the environment and (ii) the third distance.

2. The apparatus of claim 1, wherein the sensor system comprises:
    a sensor array configured to receive the first optical signal and generate one or more first electrical signals; and
    one or more storage media configured to store one or more machine-learned models.

3. The apparatus of claim 2,
    wherein the sensor array is a sensor array of an RGB camera, and
    wherein the representation of the one or more first electrical signals includes at least a portion of an optical image outputted by the RGB camera.

4. The apparatus of claim 2, wherein the one or more machine-learned models comprise a convolutional neural network model.

5. The apparatus of claim 1,
    wherein the sensor system comprises a stereo camera having a plurality of lenses, and
    wherein the first optical signal includes at least a portion of a three-dimensional image outputted by the stereo camera.

6. The apparatus of claim 1,
    wherein the sensor system comprises a structured light detection system.

7. The apparatus of claim 1,
    wherein the sensor system comprises one or more direct time-of-flight sensors, and
    wherein determining the first distance comprises determining the first distance based on a round-trip travel time of light between the two points in the environment.

8. The apparatus of claim 1,
    wherein one or more indirect time-of-flight sensors are configured to operate at a first frequency,
    wherein the sensor system comprises one or more second indirect time-of-flight sensors operating at a second frequency that is less than the first frequency.

9. The apparatus of claim 1,
    wherein the sensor system comprises an image-based sensor system and a time-of-flight-based sensor system, and
    wherein determining the first distance comprises:
        obtaining an output of the image-based sensor system;
        obtaining an output of the time-of-flight-based sensor system; and
        determining the first distance based on the output of the image-based sensor system and the output of the time-of-flight-based sensor system.

10. The apparatus of claim 1,
    wherein a first point of the two points in the environment represents a location of the apparatus, and
    wherein a second point of the two points in the environment represents a location of an object in the environment.

11. The apparatus of claim 1,
    wherein the apparatus is a mobile device,
    wherein the sensor system includes one or more cameras embedded in the mobile device, and
    wherein the one or more indirect time-of-flight sensors include a three-dimensional sensor array embedded in the mobile device.

12. The apparatus of claim 11, wherein the one or more cameras and the three-dimensional sensor array are embedded in a backside of the mobile device that is on an opposite side of a screen of the mobile device.

13. The apparatus of claim 11, wherein the one or more cameras and the three-dimensional sensor array are embedded in a frontside of the mobile device that is on a same side of a screen of the mobile device.

14. The apparatus of claim 1, wherein the one or more computing devices comprise one or more processors, one or more hardwired circuitries, one or more field-programmable gate arrays, or a combination thereof.

15. The apparatus of claim 1,
    wherein the difference between (i) the true distance of the two points in the environment and (ii) the first distance represents a first error that is smaller than an unambiguous range associated with the one or more indirect time-of-flight sensors, wherein the second distance has a value that is within the unambiguous range, and wherein the difference between (i) the true distance of the two points in the environment and (ii) the third distance represents a second error that is smaller than the first error.

16. A method of determining a distance between two points in an environment, comprising:

receiving, by a sensor system, a first optical signal;

determining, by the sensor system and based on the first optical signal, a first distance between two points in an environment;

receiving, by one or more indirect time-of-flight sensors separate from the sensor system, a second optical signal;

determining, by the one or more indirect time-of-flight sensors and based on the second optical signal, a second distance between the two points in the environment;

receiving, by one or more computing devices, information representing the first distance and the second distance; and determining, by the one or more computing devices and based on the first distance and the second distance, a third distance between the two points in the environment, wherein determining the third distance between the two points in the environment comprises:

determining, based on the first distance, a multiplier for an unambiguous range associated with the one or more indirect time-of-flight sensors; and determining the third distance by adding the second distance to a product of the unambiguous range and the multiplier;

wherein a difference between (i) a true distance of the two points in the environment and (ii) the first distance is larger than a difference between (i) the true distance of the two points in the environment and (ii) the third distance.

17. The method of claim 16, wherein an autonomous vehicle or a user device comprises the sensor system, the one or more indirect time-of-flight sensors, and one or more computing devices.

18. An apparatus comprising:

a distance-estimation system comprising a sensor system, the distance-estimation system configured to:

receive a first optical signal; and generate, based on the first optical signal, a first electrical signal for determining a first distance between two points in an environment;

a distance-refinement system comprising one or more indirect time-of-flight sensors, the distance-refinement system configured to:

receive a second optical signal; and generate, based on the second optical signal, a second electrical signal for determining a second distance between the two points in the environment; and a processing system comprising one or more computing devices, the processing system configured to:

receive the first electrical signal and the second electrical signal;

provide input information representing the first electrical signal and the second electrical signal to a machine-learned model;

receive output information representing a third distance between the two points in the environment; and determine the third distance between the two points in the environment, wherein a maximum value of the second distance is less than an unambiguous range associated with the one or more indirect time-of-flight sensors, and wherein a maximum value of the third distance is more than the unambiguous range associated with the one or more indirect time-of-flight sensors.

19. An apparatus comprising:

an estimation system comprising a sensor system, the estimation system configured to:

receive a first signal; and determine, based on the first signal, a first value for a characteristic associated with a target object in an environment;

a refinement system comprising one or more indirect time-of-flight sensors, the refinement system configured to:

receive a second signal; and determine, based on the second signal, a second value for the characteristic associated with the target object in the environment; and a processing system comprising one or more computing devices, the processing system configured to:

receive information representing the first value and the second value; and determine, based on the first value and the second value, a third value for the characteristic associated with the target object in the environment, wherein determining the third value for the characteristic associated with the target object in the environment comprises:

determining, based on the first value, a multiplier for an unambiguous range associated with the one or more indirect time-of-flight sensors; and determining the third value by adding the second value to a product of the unambiguous range and the multiplier;

wherein a difference between (i) a true value for the characteristic associated with the target object in the environment and (ii) the first value is larger than a difference between (i) true value for the characteristic and (ii) the third value.

* * * * *